(12) United States Patent
Hu et al.

(10) Patent No.: US 10,489,637 B2
(45) Date of Patent: Nov. 26, 2019

(54) METHOD AND DEVICE FOR OBTAINING SIMILAR FACE IMAGES AND FACE IMAGE INFORMATION

(71) Applicant: Beijing Qihoo Technology Company Limited, Xicheng District (CN)

(72) Inventors: Jinhui Hu, Beijing (CN); Jin Zhao, Beijing (CN); Maoqing Zhu, Beijing (CN); Zhe Tao, Beijing (CN); Yuqi Guo, Beijing (CN); Yugang Han, Beijing (CN)

(73) Assignee: Beijing Qihoo Technology Company Limited, Xicheng District (CN)

( * ) Notice: Subject to any disclaimer, the term of this patent is extended or adjusted under 35 U.S.C. 154(b) by 51 days.

(21) Appl. No.: 15/539,644

(22) PCT Filed: Nov. 27, 2015

(86) PCT No.: PCT/CN2015/095861
§ 371 (c)(1),
(2) Date: Jun. 23, 2017

(87) PCT Pub. No.: WO2016/101766
PCT Pub. Date: Jun. 30, 2016

(65) Prior Publication Data
US 2018/0005022 A1    Jan. 4, 2018

(30) Foreign Application Priority Data

Dec. 23, 2014    (CN) .......................... 2014 1 0812175
Dec. 23, 2014    (CN) .......................... 2014 1 0816768

(51) Int. Cl.
G06K 9/00    (2006.01)
G06F 16/583    (2019.01)
(Continued)

(52) U.S. Cl.
CPC ....... *G06K 9/00288* (2013.01); *G06F 16/532* (2019.01); *G06F 16/5838* (2019.01);
(Continued)

(58) Field of Classification Search
CPC .. G06K 9/00288; G06K 9/00; G06K 9/00248; G06K 9/00677; G06K 9/46; G06F 17/30256; G06F 17/30277; G06F 3/14
See application file for complete search history.

(56) References Cited

U.S. PATENT DOCUMENTS 8,755,837 B2 *   6/2014   Rhoads ............. G06F 17/30244
                                                  455/556.1
8,768,313 B2 *   7/2014   Rodriguez ......... G06K 9/00986
                                                  382/118
(Continued)

FOREIGN PATENT DOCUMENTS

CN          102629275 A       8/2012
CN          102667763 A       9/2012
(Continued)

OTHER PUBLICATIONS

International Bureau of WIPO, International Search Report and Written Opinion in Application No. PCT/CN2015/095861, dated Feb. 29, 2016.
(Continued)

*Primary Examiner* — Mia M Thomas
(74) *Attorney, Agent, or Firm* — LKGlobal | Lorenz & Kopf, LLP

(57) ABSTRACT

The present invention provides a method and device for acquiring a similar human face picture and acquiring information about a human face picture. It mainly relates to the field of Internet technology, and mainly aims to provide the user a similar human face picture including a similar person when a similar picture is provided. The method comprising:
(Continued)

acquiring a human face picture specified by a user; conducting human face identification to the human face picture to identify a similar human face picture of the human face picture from human face pictures that have already been collected; and displaying the similar human face picture to the user.

15 Claims, 17 Drawing Sheets

(51) Int. Cl.
    *G06K 9/46*          (2006.01)
    *G06F 16/532*     (2019.01)
    *G06F 3/14*         (2006.01)

(52) U.S. Cl.
    CPC ........... *G06K 9/00* (2013.01); *G06K 9/00248* (2013.01); *G06K 9/00677* (2013.01); *G06K 9/46* (2013.01); *G06F 3/14* (2013.01)

(56) References Cited

U.S. PATENT DOCUMENTS

| | | | |
|---|---|---|---|
| 9,384,241 B2* | 7/2016 | Wang | G06F 16/5838 |
| 2004/0022442 A1* | 2/2004 | Kim | G06K 9/00241 |
| | | | 382/225 |
| 2009/0091629 A1 | 4/2009 | Casey | |
| 2011/0211736 A1* | 9/2011 | Krupka | G06K 9/00677 |
| | | | 382/118 |
| 2012/0183270 A1* | 7/2012 | Greenblatt | G06F 21/34 |
| | | | 386/224 |
| 2012/0222100 A1* | 8/2012 | Fisk | G06F 21/316 |
| | | | 726/7 |
| 2012/0233159 A1* | 9/2012 | Datta | G06K 9/6228 |
| | | | 707/728 |
| 2013/0011083 A1* | 1/2013 | Berkovich | G06K 9/6221 |
| | | | 382/305 |
| 2013/0236069 A1 | 9/2013 | Chang et al. | |
| 2013/0308864 A1* | 11/2013 | Naito | G06K 9/46 |
| | | | 382/190 |
| 2015/0186711 A1* | 7/2015 | Baldwin | G06F 21/32 |
| | | | 382/118 |
| 2015/0213305 A1* | 7/2015 | Sundstrom | G06F 16/00 |
| | | | 382/118 |
| 2017/0116465 A1* | 4/2017 | Ma | G06K 9/00288 |
| 2017/0180348 A1* | 6/2017 | Piccolotto | G06K 9/00906 |
| 2017/0372705 A1* | 12/2017 | Lin | B25J 9/0003 |
| 2018/0068173 A1* | 3/2018 | Kolleri | G06K 9/00288 |
| 2018/0069937 A1* | 3/2018 | Kolleri | H04L 67/22 |
| 2018/0349685 A1* | 12/2018 | Kolleri | G01S 19/13 |

FOREIGN PATENT DOCUMENTS

| | | |
|---|---|---|
| CN | 102682091 A | 9/2012 |
| CN | 102880729 A | 1/2013 |
| CN | 103425709 A | 12/2013 |
| CN | 103793697 A | 5/2014 |
| CN | 104091164 A | 10/2014 |
| CN | 104463177 A | 3/2015 |
| CN | 104537341 A | 4/2015 |

OTHER PUBLICATIONS

Chinese Patent Office, First Office Action of CN 201410812175.2, dated Jan. 14, 2016.

Chinese Patent Office, First Office Action of CN 201410816768.6, dated Apr. 1, 2017.

\* cited by examiner

METHOD AND DEVICE FOR OBTAINING SIMILAR FACE IMAGES AND FACE IMAGE INFORMATION

CROSS-REFERENCE TO RELATED APPLICATION

This application is a U.S. National-Stage entry under 35 U.S.C. § 371 based on International Application No. PCT/CN2015/095861 filed Nov. 27, 2015 which was published under PCT Article 21(2) and which claims priority to Chinese Application Nos. 201410816768.6 and 201410812175.2, both filed on Dec. 23, 2014, which are all hereby incorporated in their entirety by reference.

TECHNICAL FIELD

The present invention relates to the field of Internet technology, and particularly relates to a method and device for acquiring a similar human face picture and a method and device for acquiring information about a human face picture.

BACKGROUND

In the field of Internet technology, picture browsing accounts for a large part of the quantity of users' access.

Presently, when Internet pictures are displayed, the system tends to provide some similar pictures for user's reference. Due to the limitation of technique, usually most of the similar pictures provided are merely similar to the original picture as a whole, but the core content is often totally different, and the similarity degree is relatively low; thus the similar pictures have little value for the user. For example, the user finds on the Internet a photograph with a star A on the seashore, and needs photographs of other stars having looks and styles similar to those of the star A; however, according to technical solutions of the prior art, the user can obtain photographs with a person B on the seashore and the look and style of the star A are totally different from those of the person B; thus the photographs obtained cannot satisfy the user's demands.

SUMMARY

The present invention is proposed in view of the above problems to provide a method and device for acquiring a similar human face picture and a method and device for acquiring information about a human face picture, which can solve or at least partly solve the above problems.

According to an aspect of the present invention, there is provided a method for acquiring a similar human face picture, comprising: acquiring a human face picture specified by a user; conducting human face identification to the human face picture to identify a similar human face picture of the human face picture from human face pictures that have already been collected; and displaying the similar human face picture to the user.

According to another aspect of the present invention, there is also provided a device for acquiring a similar human face picture, comprising: a human face picture acquiring module, for acquiring a human face picture specified by a user; a human face picture identifying module, for conducting human face identification to the human face picture to identify a similar human face picture of the human face picture from human face pictures that have already been collected; and a human face picture displaying module, for displaying the similar human face picture to the user.

According to yet another aspect of the present invention, there is provided a method for acquiring information about a human face picture, comprising: acquiring a human face picture specified by a user; conducting human face identification to the human face picture to obtain a personal name of a human face in the human face picture; acquiring network resource information corresponding to the personal name from a network according to the personal name; and displaying the network resource information corresponding to the personal name to the user.

According to still another aspect of the present invention, there is also provided a device for acquiring information about a human face picture, comprising: a human face picture acquiring module, for acquiring a human face picture specified by a user; a personal name acquiring module, for conducting human face identification to the human face picture to obtain a personal name of a human face in the human face picture; an information acquiring module, for acquiring network resource information corresponding to the personal name from a network according to the personal name; and an information displaying module, for displaying the network resource information corresponding to the personal name to the user.

According to yet another aspect of the present invention, there is provided a computer program comprising a computer readable code, which causes a computing device to execute the method for acquiring a similar human face picture described above, or causes a computing device to execute the method for acquiring information about a human face picture described above, when the computer readable code is running on the computing device.

According to still another aspect of the present invention, there is provided a non-transitory computer readable medium that stores the computer program described above.

According to the above technical solutions, the method and device for acquiring a similar human face picture of the present invention can have at least the following advantages:

Based on human face identification techniques, a similar human face picture is provided to the user according to the human face picture specified by the user, and thus the human face in the picture specified by the user and the human face in the similar human face picture have a large similarity degree. When the user demands to learn about other persons similar to the person in the specified human face picture, the technical solutions of the present invention can satisfy the user's demand.

The above description is merely an overview of technical solutions of the present invention. In order to more apparently understand technical solutions of the present invention and implement them in accordance with contents of the specification, and to more readily understand above and other objectives, features and advantages of the present invention, particular embodiments of the present invention are provided hereinafter.

BRIEF DESCRIPTION OF THE DRAWINGS

Various other advantages and merits will become apparent to those having ordinary skill in the art by reading through the detailed description of the following preferred embodiments. Accompanying drawings are merely included for the purpose of illustrating the preferred embodiments and should not be considered as limiting of the present invention. Further, throughout the drawings, like reference signs are used to denote like elements. In the drawings.

DETAILED DESCRIPTION

Exemplary embodiments of the present invention will be described in more detail below with reference to the accompanying drawings. Although the accompanying drawings display the exemplary embodiments of the present invention, it should be understood that the present invention may be implemented in various forms and not limited by the embodiments set forth herein. Instead, these embodiments are provided to facilitate those skilled in the art to more thoroughly understand the present invention, and to completely convey the scope of the present invention to them.

Figure 1:
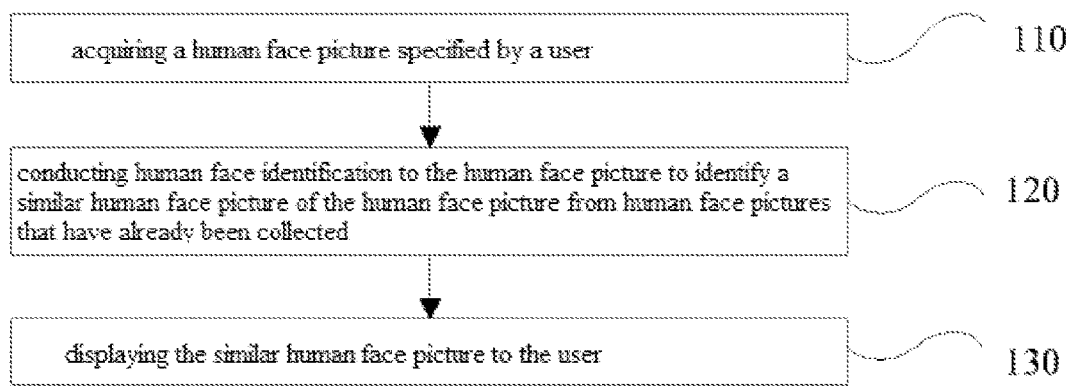
FIG. 1 illustrates a flow chart of a method for acquiring a similar human face picture according to an embodiment of the present invention.

As shown in FIG. 1, an embodiment of the present invention provides a method for acquiring a similar human face picture comprising the following steps.

Step 110, acquiring a human face picture specified by a user.

Step 120, conducting human face identification to the human face picture to identify a similar human face picture of the human face picture from human face pictures that have already been collected. In the present embodiment, acquiring a personal name can be completed based on conventional human face identification techniques.

Step 130, displaying the similar human face picture to the user. According to the technical solution of the present embodiment, a similar human face picture is provided to the user according to the human face picture specified by the user; thus the human face in the picture specified by the user and the human face in the similar human face picture have a large similarity degree. When the user demands to learn about other persons similar to the person in the specified human face picture, the technical solution of the present embodiment can satisfy the user's demand.

According to FIG. 1, the user inputs a photograph of a star A, and needs to find photographs of other persons having looks and styles similar to those of the star A. Based on human face identification techniques, the star A in the picture is identified, and a photograph of a star C, whose human face is similar to that of the star A, is found from a preset human face picture library, which facilitates the user to learn about the star C.

Figure 2:
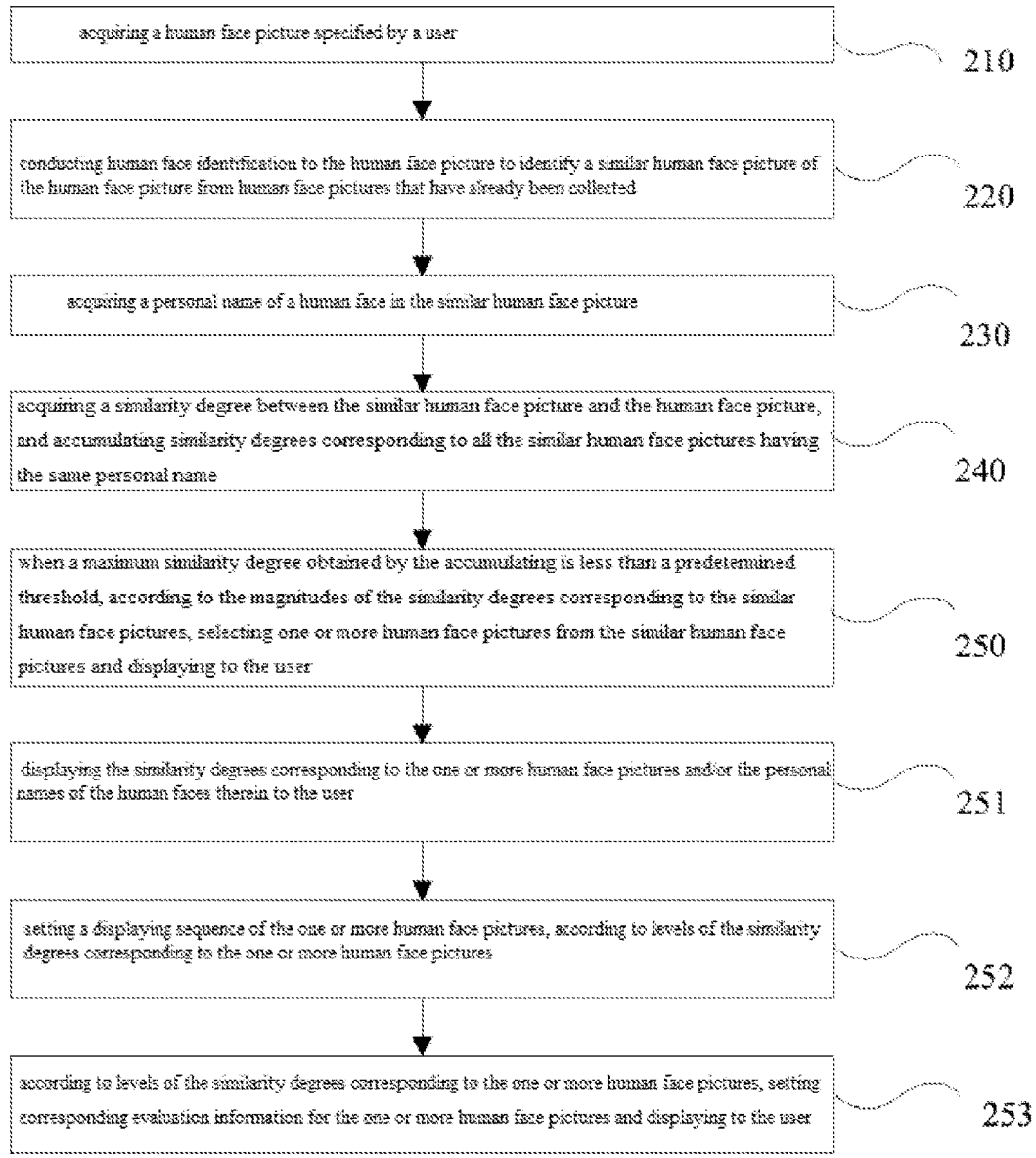
FIG. 2 illustrates a flow chart of a method for acquiring a similar human face picture according to an embodiment of the present invention.

As shown in FIG. 2, an embodiment of the present invention provides a method for acquiring a similar human face picture comprising the following steps.

Step 210, acquiring a human face picture specified by a user.

Step 220, conducting human face identification to the human face picture to identify a similar human face picture of the human face picture from human face pictures that have already been collected.

Step 230, acquiring a personal name of a human face in the similar human face picture.

Step 240, acquiring a similarity degree between the similar human face picture and the human face picture, and accumulating similarity degrees corresponding to all the similar human face pictures having the same personal name. In the present embodiment, accumulating of the similarity degrees is equivalent to, based on the personal names, comprehensively calculating the similarity degrees between one or more human face pictures of each person and the original human face picture, and thus it facilitates finding the person having the highest similarity degree by accumulating the similar pictures.

Step 250, when a maximum similarity degree obtained by the accumulating is less than a predetermined threshold, according to the magnitudes of the similarity degrees corresponding to the similar human face pictures, selecting one or more human face pictures from the similar human face pictures and displaying to the user. In the present embodiment, when the maximum similarity degree obtained by the accumulating exceeds a certain threshold, it indicates that a human face picture of the totally same person has already been searched out. At this point, the human face picture of the same person is preferentially provided to the user to indicate that the person has been accurately identified out.

According to FIG. 2, the user inputs a photograph of a star A and obtains the similar human face pictures as follows: the photograph a is a photograph of a star C, with a similarity degree of 80%; the photograph b is a photograph of a star D, with a similarity degree of 70%; the photograph c is a photograph of the star C, with a similarity degree of 70%; and the photograph d is a photograph of the star D, with a similarity degree of 55%. After the accumulating, the similarity degree corresponding to the star C is 150%, and the similarity degree corresponding to the star D is 125%. The preset threshold is 90%×n, wherein n is the number of photographs corresponding to each personal name; thus the thresholds for the star C and the star D are both 180%, which indicates that there is not a human face picture of the same person. At this point, the photograph corresponding to the star C can be outputted, which indicates that the picture of the star C is the similar human face picture of the star A.

An embodiment of the present invention provides a method for acquiring a similar human face picture comprising the following steps.

Step 210, acquiring a human face picture specified by a user.

Step 220, conducting human face identification to the human face picture to identify a similar human face picture of the human face picture from human face pictures that have already been collected.

Step 230, acquiring a personal name of a human face in the similar human face picture.

Step 240, acquiring a similarity degree between the similar human face picture and the human face picture, and accumulating similarity degrees corresponding to all the similar human face pictures having the same personal name.

Step 250, when a maximum similarity degree obtained by the accumulating is less than a predetermined threshold, according to the magnitudes of the similarity degrees corresponding to the similar human face pictures, selecting one or more human face pictures from the similar human face pictures and displaying to the user.

Step 251, displaying the similarity degrees corresponding to the one or more human face pictures and/or the personal names of the human faces therein to the user. In the present embodiment, the similarity degrees and the personal names are prompted to the user, so that the user could learn more about the similar human face pictures.

According to FIG. 2, the user inputs a photograph of a star A, and the similar human face picture acquired according to the technical solution of the present embodiment is a photograph of a star C. On the photograph of the star C it is displayed that the similarity degree is 80% and its personal name is C.

An embodiment of the present invention provides a method for acquiring a similar human face picture comprising the following steps.

Step 210, acquiring a human face picture specified by a user.

Step 220, conducting human face identification to the human face picture to identify a similar human face picture of the human face picture from human face pictures that have already been collected.

Step 230, acquiring a personal name of a human face in the similar human face picture.

Step 240, acquiring a similarity degree between the similar human face picture and the human face picture, and accumulating similarity degrees corresponding to all the similar human face pictures having the same personal name.

Step 250, when a maximum similarity degree obtained by the accumulating is less than a predetermined threshold, according to the magnitudes of the similarity degrees corresponding to the similar human face pictures, selecting one or more human face pictures from the similar human face pictures and displaying to the user.

Step 252, setting a displaying sequence of the one or more human face pictures according to levels of the similarity degrees corresponding to the one or more human face pictures. In the present embodiment, it facilitates providing the most similar photograph to the user first.

According to FIG. 2, the user inputs a photograph of a star A, and the similar human face pictures acquired according to the technical solution of the present embodiment are a photograph of a star C and a photograph of a star D, with similarity degrees of 80% and 85% respectively. Then, the photograph of the star D is displayed first, and the photograph of the star C is displayed next.

An embodiment of the present invention provides a method for acquiring a similar human face picture comprising the following steps.

Step 210, acquiring a human face picture specified by a user.

Step 220, conducting human face identification to the human face picture to identify a similar human face picture of the human face picture from human face pictures that have already been collected.

Step 230, acquiring a personal name of a human face in the similar human face picture.

Step 240, acquiring a similarity degree between the similar human face picture and the human face picture, and accumulating similarity degrees corresponding to all the similar human face pictures having the same personal name.

Step 250, when a maximum similarity degree obtained by the accumulating is less than a predetermined threshold, according to the magnitudes of the similarity degrees corresponding to the similar human face pictures, selecting one or more human face pictures from the similar human face pictures and displaying to the user.

Step 253, according to levels of the similarity degrees corresponding to the one or more human face pictures, setting corresponding evaluation information for the one or more human face pictures and displaying to the user. According to the technical solution of the present embodiment, the evaluation information can indicate the levels of the similarity degrees in a manner that the user can more easily understand.

According to FIG. 2, the user inputs a photograph of a star A, and the similar human face picture acquired according to the technical solution of the present embodiment is a photograph of a star C, with a similarity degree of 80%. Then the evaluation information displayed on the photograph is: "a sister not being in touch for many years".

Figure 3:
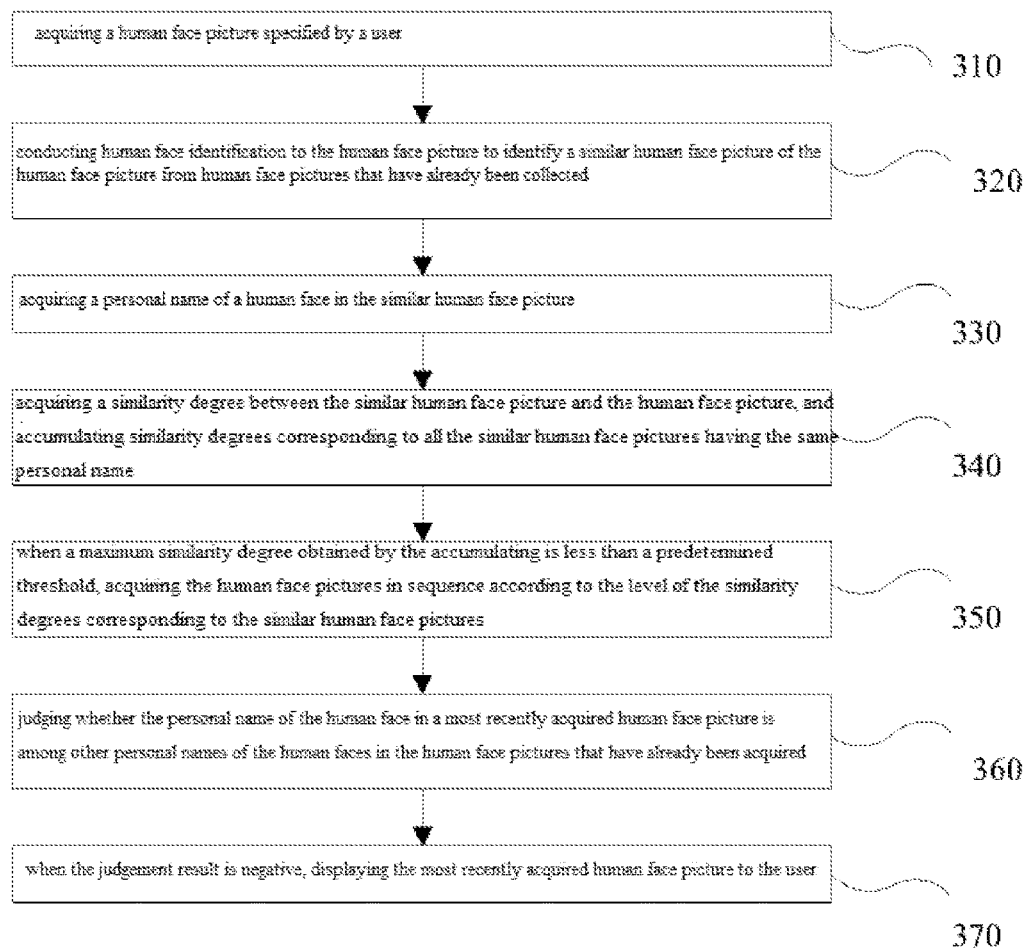
FIG. 3 illustrates a flow chart of a method for acquiring a similar human face picture according to an embodiment of the present invention.

As shown in FIG. 3, an embodiment of the present invention provides a method for acquiring a similar human face picture comprising the following steps.

Step 310, acquiring a human face picture specified by a user.

Step 320, conducting human face identification to the human face picture to identify a similar human face picture of the human face picture from human face pictures that have already been collected.

Step 330, acquiring a personal name of a human face in the similar human face picture.

Step 340, acquiring a similarity degree between the similar human face picture and the human face picture, and accumulating similarity degrees corresponding to all the similar human face pictures having the same personal name.

Step 350, when a maximum similarity degree obtained by the accumulating is less than a predetermined threshold, acquiring the human face pictures in sequence according to the level of the similarity degrees corresponding to the similar human face pictures.

Step 360, judging whether the personal name of the human face in a most recently acquired human face picture is among other personal names of the human faces in the human face pictures that have already been acquired.

Step 370, when the judgement result is negative, displaying the most recently acquired human face picture to the user. According to the technical solution of the present embodiment, repeatedly emerging of similar human face pictures of the same persons can be avoided, to ensure that the user can see similar human face pictures of more different persons as far as possible.

According to FIG. 3, the user inputs a photograph of a star A and obtains the similar human face pictures as follows: the photograph a is a photograph of a star C, with a similarity degree of 80%; the photograph b is a photograph of a star D, with a similarity degree of 70%; the photograph c is a photograph of the star C, with a similarity degree of 70%; and the photograph d is a photograph of the star D, with a similarity degree of 55%. The process is that, according to levels of the similarity degrees, displaying the photograph a first; then acquiring the photograph b, and if finding that the photograph of the star D has not been displayed, displaying the photograph b; then acquiring the photograph c, and if finding that the photograph of the star C has already been displayed, abandoning the displaying; then acquiring the photograph d, and if finding that the photograph of the star D has already been displayed, abandoning the displaying.

Figure 4:
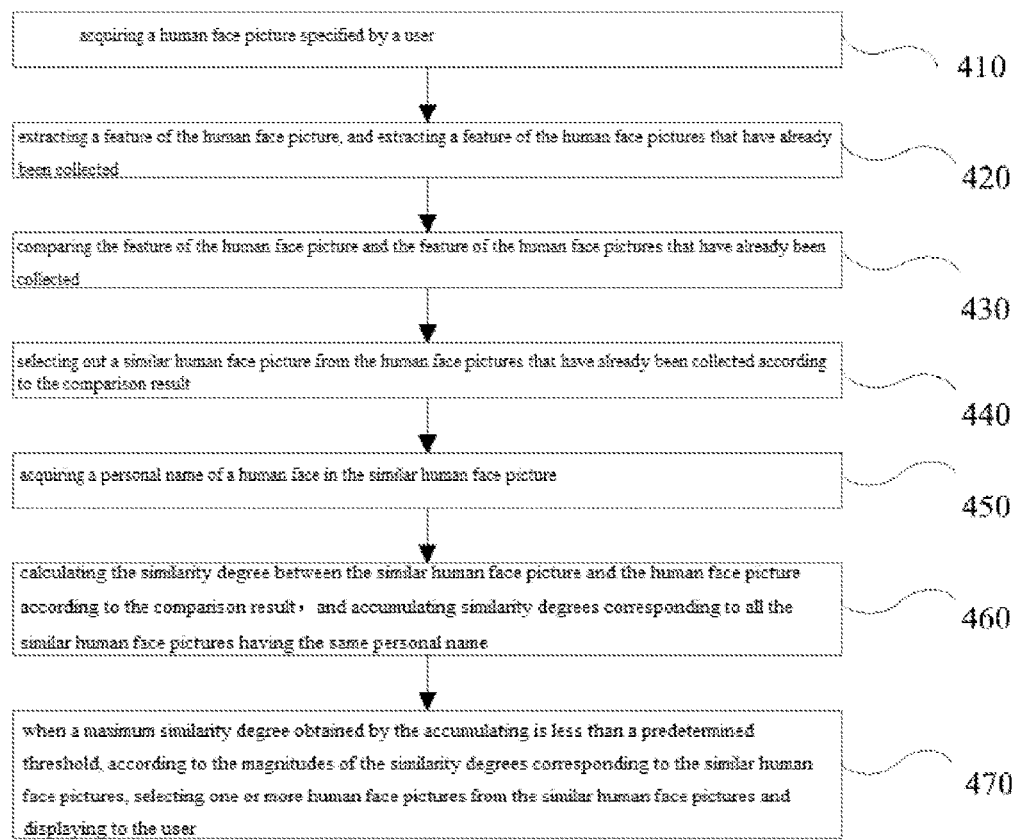
FIG. 4 illustrates a flow chart of a method for acquiring a similar human face picture according to an embodiment of the present invention.

As shown in FIG. 4, an embodiment of the present invention provides a method for acquiring a similar human face picture comprising the following steps.

Step 410, acquiring a human face picture specified by a user.

Step 420, extracting a feature of the human face picture, and extracting a feature of the human face pictures that have already been collected. In the present embodiment, the human face picture specified by the user can be preprocessed and normalized in advance, to facilitate the feature extracting. In the present embodiment, it is possible to collect sample human face pictures and detect skin color, eyes, nose, mouth corners, etc. The data obtained by detection can be used to train a human face model, and by using the human face model, the position of the human face in the picture specified by the user can be identified out, and the feature can be extracted.

Step 430, comparing the feature of the human face picture and the feature of the human face pictures that have already been collected.

Step 440, selecting out a similar human face picture from the human face pictures that have already been collected according to the comparison result.

Step 450, acquiring a personal name of a human face in the similar human face picture.

Step 460, calculating the similarity degree between the similar human face picture and the human face picture according to the comparison result, and accumulating similarity degrees corresponding to all the similar human face pictures having the same personal name.

Step 470, when a maximum similarity degree obtained by the accumulating is less than a predetermined threshold, according to the magnitudes of the similarity degrees corresponding to the similar human face pictures, selecting one or more human face pictures from the similar human face pictures and displaying to the user.

According to FIG. 4, judging whether the picture specified by the user belongs to a certain human face in a database where personal names have been established (human face pictures that have already been collected). First, establishing a database of the human faces of known personal names by human face detection, feature extracting and personal name extracting; for a new human face picture specified by the user, conducting face detection to the picture; if there is not the human face, returning directly; if there is the human face, extracting a feature of the human face, and quantifying it into a high dimension vector. Then comparing the vector of the inputted picture and high dimension vectors of all the human face features in the database, calculating their Euclidean distance, and taking the first N vectors with the lowest distances. The human faces characterized by these vectors are the human faces most similar to the inputted human face. If the human face database is too large, it will take very long to compare one by one. Thus, alternatively, classifying the human faces in the database in advance, then comparing with the human faces that have already been classified only. For the first N similar human faces, calculating the weight of each name with the similarity degree as the weight, adding the weight values of the same name, and finding the name having the highest weight. If the name is larger than a certain threshold, the inputted human face is deemed to belong to the human faces corresponding to the name; otherwise it will be deemed that the human face cannot be accurately identified out.

Figure 5:
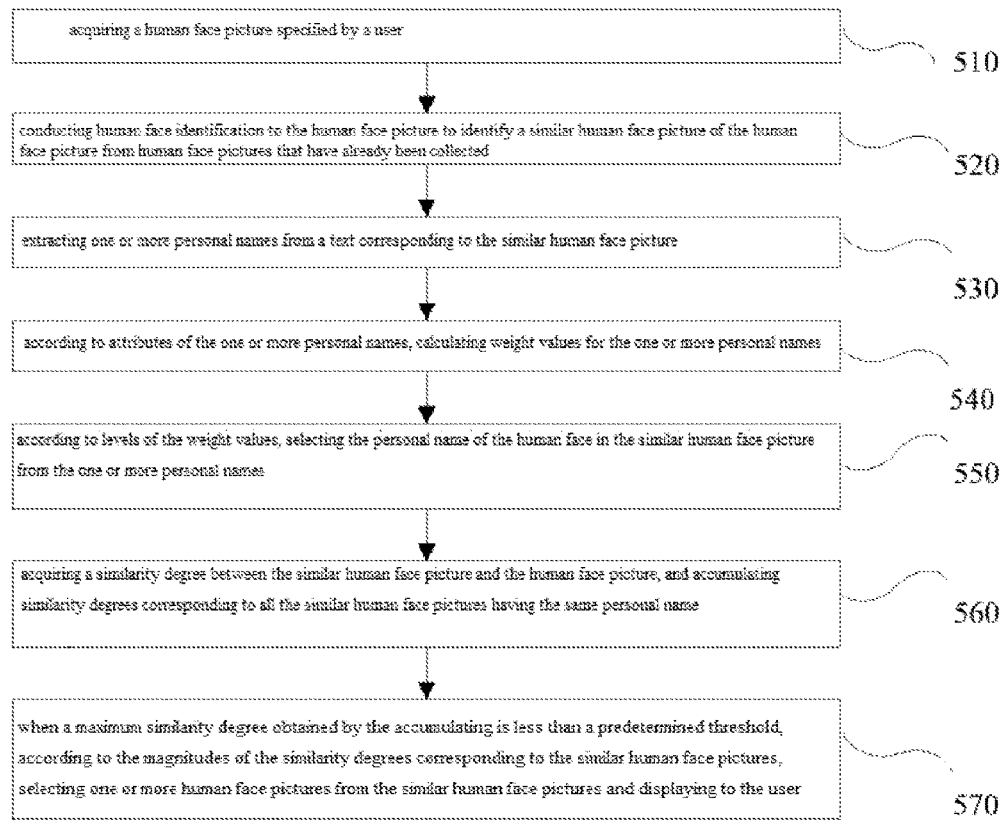
FIG. 5 illustrates a flow chart of a method for acquiring a similar human face picture according to an embodiment of the present invention.

As shown in FIG. 5, an embodiment of the present invention provides a method for acquiring a similar human face picture comprising the following steps.

Step 510, acquiring a human face picture specified by a user.

Step 520, conducting human face identification to the human face picture to identify a similar human face picture of the human face picture from human face pictures that have already been collected.

Step 530, extracting one or more personal names from a text corresponding to the similar human face picture. In the present embodiment, there is no limitation on the type of the text, and it may be headline of news containing the picture, a text circling the picture, etc.

Step 540, according to attributes of the one or more personal names, calculating weight values for the one or more personal names. In the present embodiment, there is no limitation on the attributes, and they may be frequency or position of the personal names, since different frequencies and positions of personal names indicate different possibilities of the personal names corresponding to the similar human face picture.

Step 550, according to levels of the weight values, selecting the personal name of the human face in the similar human face picture from the one or more personal names.

Step 560, acquiring a similarity degree between the similar human face picture and the human face picture, and accumulating similarity degrees corresponding to all the similar human face pictures having the same personal name.

Step 570, when a maximum similarity degree obtained by the accumulating is less than a predetermined threshold, according to the magnitudes of the similarity degrees corresponding to the similar human face pictures, selecting one or more human face pictures from the similar human face pictures and displaying to the user.

According to FIG. 5, for a news page where the similar human face picture comes from, first, preprocessing the headline of the news corresponding to the picture and the text circling the picture, then separating the words; extracting candidate personal names from the word separating result, comparing them with a personal name word list, and removing the words that are not a personal name; calculating a weight according to frequency and position of each personal name and its relation with other words; if the weight is larger than a certain threshold, selecting the name having the maximum weight as the personal name of the human face in the picture, otherwise it will be deemed that a reliable personal name cannot be extracted.

Figure 6:
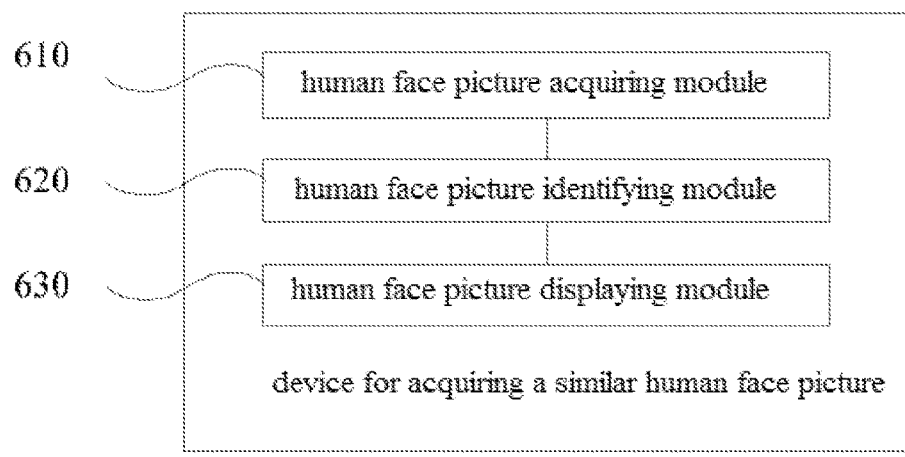
FIG. 6 illustrates a block diagram of a device for acquiring a similar human face picture according to an embodiment of the present invention.

As shown in FIG. 6, an embodiment of the present invention provides a device for acquiring a similar human face picture comprising the following parts.

A human face picture acquiring module 610, acquiring a human face picture specified by a user.

A human face picture identifying module 620, conducting human face identification to the human face picture to identify a similar human face picture of the human face picture from human face pictures that have already been collected. In the present embodiment, acquiring a personal name can be completed based on conventional human face identification techniques.

A human face picture displaying module 630, displaying the similar human face picture to the user. According to the technical solution of the present embodiment, a similar human face picture is provided to the user according to the human face picture specified by the user; thus the human face in the picture specified by the user and the human face in the similar human face picture have a large similarity degree. When the user demands to learn about other persons similar to the person in the specified human face picture, the technical solution of the present embodiment can satisfy the user's demand.

According to FIG. 6, the user inputs a photograph of a star A, and needs to find photographs of other persons having looks and styles similar to those of the star A. Based on human face identification techniques, the star A in the picture is identified, and a photograph of a star C, whose human face is similar to that of the star A, is found from a preset human face picture library, which facilitates the user to learn about the star C.

Figure 7:
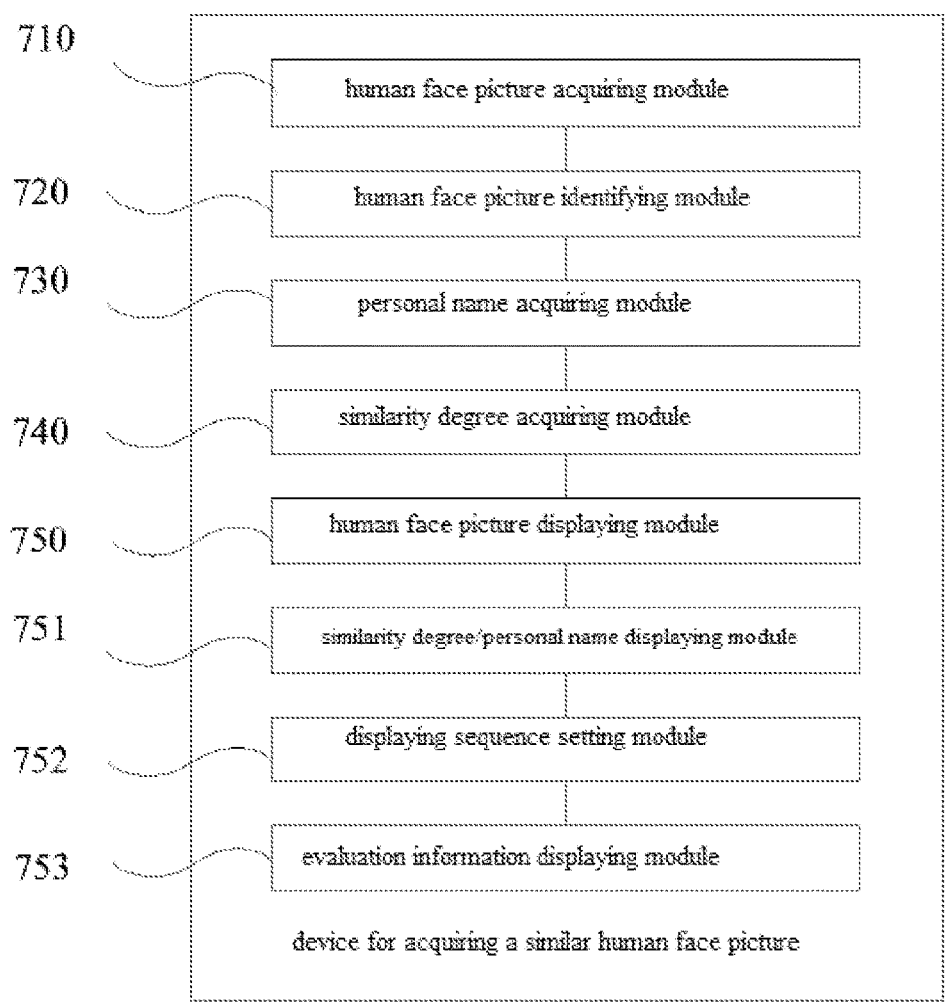
FIG. 7 illustrates a block diagram of a device for acquiring a similar human face picture according to an embodiment of the present invention.

As shown in FIG. 7, an embodiment of the present invention provides a device for acquiring a similar human face picture comprising the following parts.

A human face picture acquiring module 710, acquiring a human face picture specified by a user.

A human face picture identifying module 720, conducting human face identification to the human face picture to identify a similar human face picture of the human face picture from human face pictures that have already been collected.

A personal name acquiring module 730, acquiring a personal name of a human face in the similar human face picture.

A similarity degree acquiring module 740, acquiring a similarity degree between the similar human face picture and the human face picture, and accumulating similarity degrees corresponding to all the similar human face pictures having the same personal name. In the present embodiment, accumulating of the similarity degrees is equivalent to, based on the personal names, comprehensively calculating the similarity degrees between one or more human face pictures of each person and the original human face picture, and thus it facilitates finding the person having the highest similarity degree by accumulating the similar pictures.

A human face picture displaying module 750, when a maximum similarity degree obtained by the accumulating is less than a predetermined threshold, according to the magnitudes of the similarity degrees corresponding to the similar human face pictures, selecting one or more human face pictures from the similar human face pictures and displaying to the user. In the present embodiment, when the maximum similarity degree obtained by the accumulating exceeds a certain threshold, it indicates that a human face picture of the totally same person has already been searched out. At this point, the human face picture of the same person is preferentially provided to the user to indicate that the person has been accurately identified out.

According to FIG. 7, the user inputs a photograph of a star A and obtains the similar human face pictures as follows: the photograph a is a photograph of a star C, with a similarity degree of 80%; the photograph b is a photograph of a star D, with a similarity degree of 70%; the photograph c is a photograph of the star C, with a similarity degree of 70%; and the photograph d is a photograph of the star D, with a similarity degree of 55%. After the accumulating, the similarity degree corresponding to the star C is 150%, and the similarity degree corresponding to the star D is 125%. The preset threshold is 90%×n, wherein n is the number of the photographs corresponding to each of the personal names, and thus the thresholds for the star C and the star D are both 180%, which indicates that there is not a human face picture of the same person. At this point, the photograph corresponding to the star C can be outputted, which indicates that the star C is the similar human face picture of the star A.

An embodiment of the present invention provides a device for acquiring a similar human face picture comprising the following parts.

A human face picture acquiring module 710, acquiring a human face picture specified by a user.

A human face picture identifying module 720, conducting human face identification to the human face picture to identify a similar human face picture of the human face picture from human face pictures that have already been collected.

A personal name acquiring module 730, acquiring a personal name of a human face in the similar human face picture.

A similarity degree acquiring module 740, acquiring a similarity degree between the similar human face picture and the human face picture, and accumulating similarity degrees corresponding to all the similar human face pictures having the same personal name.

A human face picture displaying module 750, when a maximum similarity degree obtained by the accumulating is less than a predetermined threshold, according to the magnitudes of the similarity degrees corresponding to the similar human face pictures, selecting one or more human face pictures from the similar human face pictures and displaying to the user.

A similarity degree/personal name displaying module 751, displaying the similarity degrees corresponding to the one or more human face pictures and/or the personal names of the human faces therein to the user. In the present embodiment, the similarity degrees and the personal names are prompted to the user, so that the user could learn more about the similar human face pictures.

According to FIG. 7, the user inputs a photograph of a star A, and the similar human face picture acquired according to the technical solution of the present embodiment is a photograph of a star C. On the photograph of the star C it is displayed that the similarity degree is 80% and its personal name is C.

An embodiment of the present invention provides a device for acquiring a similar human face picture comprising the following parts.

A human face picture acquiring module 710, acquiring a human face picture specified by a user.

A human face picture identifying module 720, conducting human face identification to the human face picture to identify a similar human face picture of the human face picture from human face pictures that have already been collected.

A personal name acquiring module 730, acquiring a personal name of a human face in the similar human face picture.

A similarity degree acquiring module 740, acquiring a similarity degree between the similar human face picture and the human face picture, and accumulating similarity degrees corresponding to all the similar human face pictures having the same personal name.

A human face picture displaying module 750, when a maximum similarity degree obtained by the accumulating is less than a predetermined threshold, according to the magnitudes of the similarity degrees corresponding to the similar human face pictures, selecting one or more human face pictures from the similar human face pictures and displaying to the user.

A displaying sequence setting module 752, setting a displaying sequence of the one or more human face pictures, according to levels of the similarity degrees corresponding to the one or more human face pictures. In the present embodiment, it facilitates providing the most similar photograph to the user first.

According to FIG. 7, the user inputs a photograph of a star A, and the similar human face pictures acquired according to the technical solution of the present embodiment are one photograph of a star C and one photograph of a star D, with similarity degrees of 80% and 85% respectively. Then, the photograph of the star D is displayed first, and the photograph of the star C is displayed next. An embodiment of the present invention provides a device for acquiring a similar human face picture comprising the following parts.

A human face picture acquiring module 710, acquiring a human face picture specified by a user.

A human face picture identifying module 720, conducting human face identification to the human face picture to identify a similar human face picture of the human face picture from human face pictures that have already been collected.

A personal name acquiring module 730, acquiring a personal name of a human face in the similar human face picture.

A similarity degree acquiring module 740, acquiring a similarity degree between the similar human face picture and the human face picture, and accumulating similarity degrees corresponding to all the similar human face pictures having the same personal name.

A human face picture displaying module 750, when a maximum similarity degree obtained by the accumulating is less than a predetermined threshold, according to the magnitudes of the similarity degrees corresponding to the similar human face pictures, selecting one or more human face pictures from the similar human face pictures and displaying to the user.

An evaluation information displaying module 753, setting corresponding evaluation information for the one or more human face pictures and displaying to the user, after according to levels of the similarity degrees corresponding to the one or more human face pictures. According to the technical solution of the present embodiment, the evaluation information can indicate the levels of the similarity degrees in a manner that the user can more easily understand.

According to FIG. 7, the user inputs a photograph of a star A, and the similar human face picture acquired according to the technical solution of the present embodiment is a photograph of a star C, with a similarity degree of 80%. Then the evaluation information displayed on the photograph is: "a sister not being in touch for many years".

Figure 8:
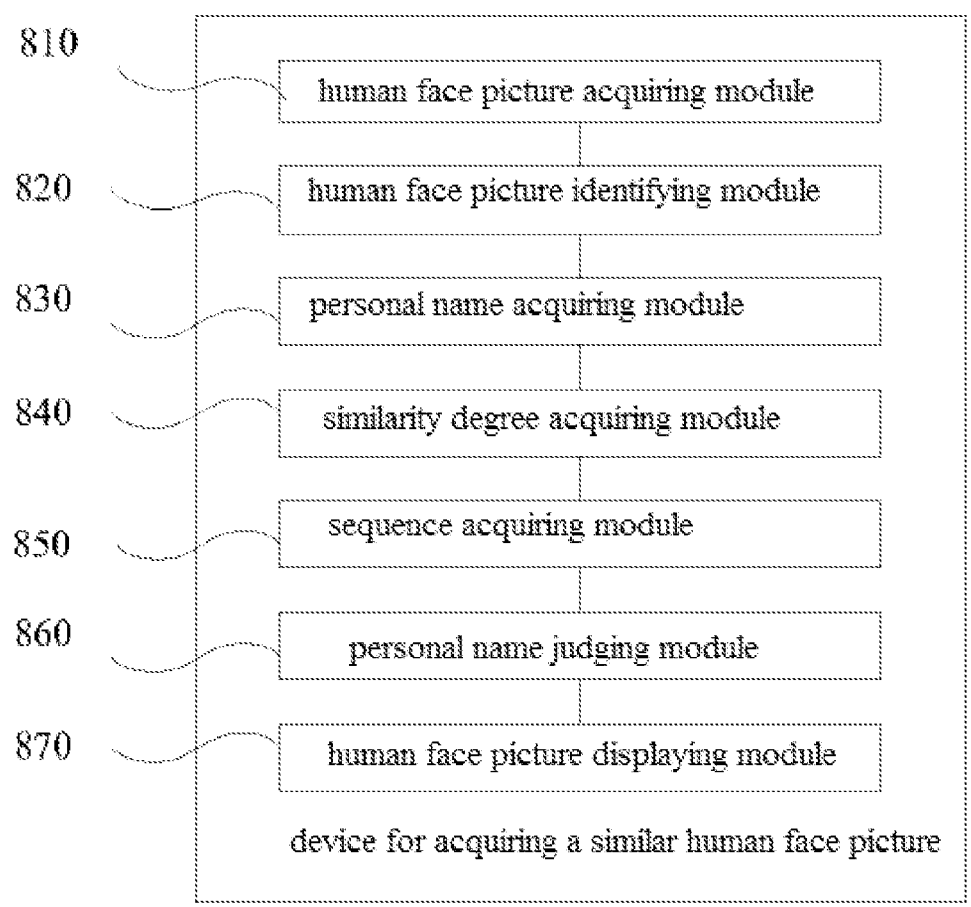
FIG. 8 illustrates a block diagram of a device for acquiring a similar human face picture according to an embodiment of the present invention.

As shown in FIG. 8, an embodiment of the present invention provides a device for acquiring a similar human face picture comprising the following parts.

A human face picture acquiring module 810, acquiring a human face picture specified by a user.

A human face picture identifying module 820, conducting human face identification to the human face picture to identify a similar human face picture of the human face picture from human face pictures that have already been collected.

A personal name acquiring module 830, acquiring a personal name of a human face in the similar human face picture.

A similarity degree acquiring module 840, acquiring a similarity degree between the similar human face picture and the human face picture, and accumulating similarity degrees corresponding to all the similar human face pictures having the same personal name.

A sequence acquiring module 850, when a maximum similarity degree obtained by the accumulating is less than a predetermined threshold, acquiring the human face pictures in sequence according to the level of the similarity degrees corresponding to the similar human face pictures.

A personal name judging module 860, judging whether the personal name of the human face in a most recently acquired human face picture is among other personal names of the human faces in the human face pictures that have already been acquired.

A human face picture displaying module 870, when the judgement result is negative, displaying the most recently acquired human face picture to the user. According to the technical solution of the present embodiment, repeatedly emerging of similar human face pictures of the same persons can be avoided, to ensure that the user can see similar human face pictures of more different persons as far as possible.

According to FIG. 8, the user inputs a photograph of a star A and obtains the similar human face pictures as follows: the photograph a is a photograph of a star C, with a similarity degree of 80%; the photograph b is a photograph of a star D, with a similarity degree of 70%; the photograph c is a photograph of the star C, with a similarity degree of 70%; and the photograph d is a photograph of the star D, with a similarity degree of 55%. The process is that, according to levels of the similarity degrees, displaying the photograph a first; then acquiring the photograph b, and if finding that the photograph of the star D has not been displayed, displaying the photograph b; then acquiring the photograph c, and if finding that the photograph of the star C has already been displayed, abandoning the displaying; then acquiring the photograph d, and if finding that the photograph of the star D has already been displayed, abandoning the displaying.

Figure 9:
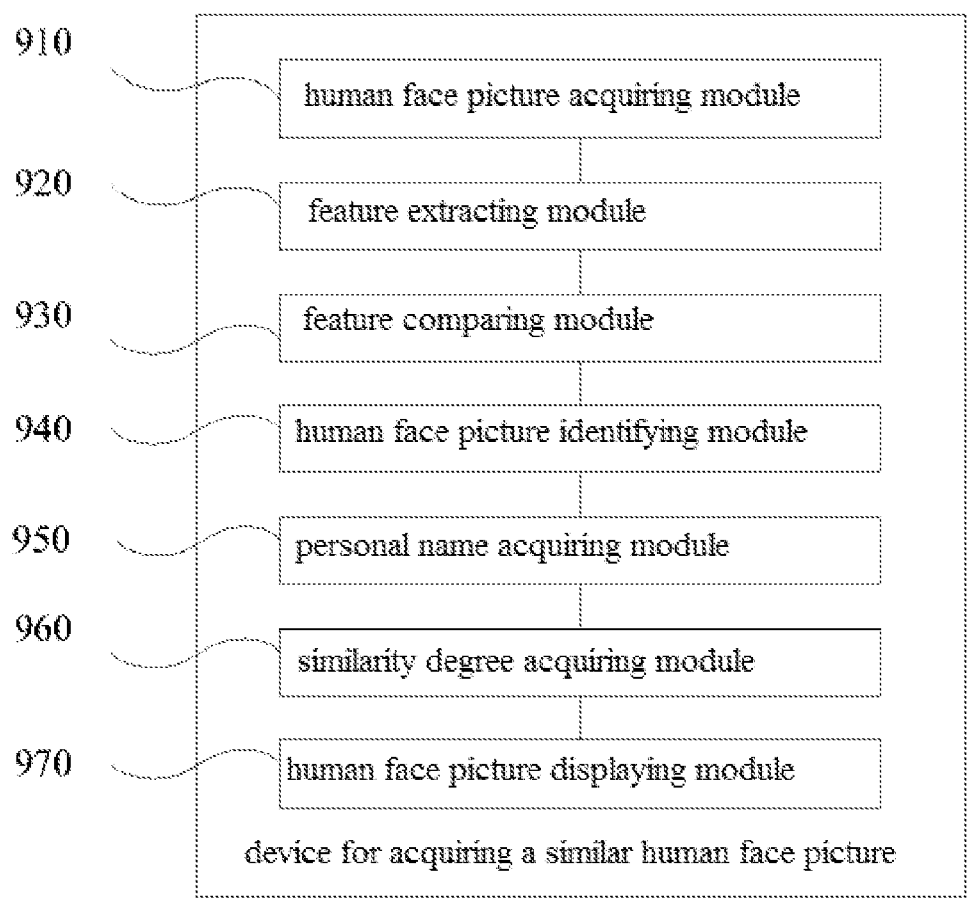
FIG. 9 illustrates a block diagram of a device for acquiring a similar human face picture according to an embodiment of the present invention.

As shown in FIG. 9, an embodiment of the present invention provides a device for acquiring a similar human face picture comprising the following parts.

A human face picture acquiring module 910, acquiring a human face picture specified by a user.

A feature extracting module 920, extracting a feature of the human face picture, and extracting a feature of the human face pictures that have already been collected. In the present embodiment, the human face picture specified by the user can be preprocessed and normalized in advance, to facilitate the feature extracting. In the present embodiment, it is possible to collect sample human face pictures, and detect skin color, eyes, nose, mouth corners, etc. The data obtained by detection can be used to train a human face model, and by using the human face model, the position of the human face in the picture specified by the user can be identified out, and the feature can be extracted.

A feature comparing module 930, comparing the feature of the human face picture and the feature of the human face pictures that have already been collected.

A human face picture identifying module 940, selecting out the similar human face picture from the human face pictures that have already been collected according to the comparison result.

A personal name acquiring module 950, acquiring a personal name of a human face in the similar human face picture.

A similarity degree acquiring module 960, calculating the similarity degree between the similar human face picture and the human face picture according to the comparison result, and accumulating similarity degrees corresponding to all the similar human face pictures having the same personal name.

A human face picture displaying module 970, when a maximum similarity degree obtained by the accumulating is less than a predetermined threshold, according to the magnitudes of the similarity degrees corresponding to the similar human face pictures, selecting one or more human face pictures from the similar human face pictures and displaying to the user.

According to FIG. 9, judging whether the picture specified by the user belongs to a certain human face in a database where personal names have been established (human face pictures that have already been collected). First, establishing a database of the human faces of known personal names by human face detection, feature extracting and personal name extracting; for a new human face picture specified by the user, conducting face detection to the picture; if there is not the human face, returning directly; if there is the human face, extracting a feature of the human face, and quantifying it into a high dimension vector. Then comparing the vector of the inputted picture and high dimension vectors of all the human face features in the database, calculating their Euclidean distance, and taking the first N vectors with the lowest distances. The human faces characterized by these vectors are the human faces most similar to the inputted human face. If the human face database is too large, it will take very long to compare one by one. Thus, alternatively, classifying the human faces in the database in advance, then comparing with the human faces that have already been classified only. For the first N similar human faces, calculating the weight of each name with the similarity degree as the weight, adding the weight values of the same name, and finding the name having the highest weight. If the name is larger than a certain threshold, the inputted human face is deemed to belong to the human faces corresponding to the name; otherwise it will be deemed that the human face cannot be accurately identified out.

Figure 10:
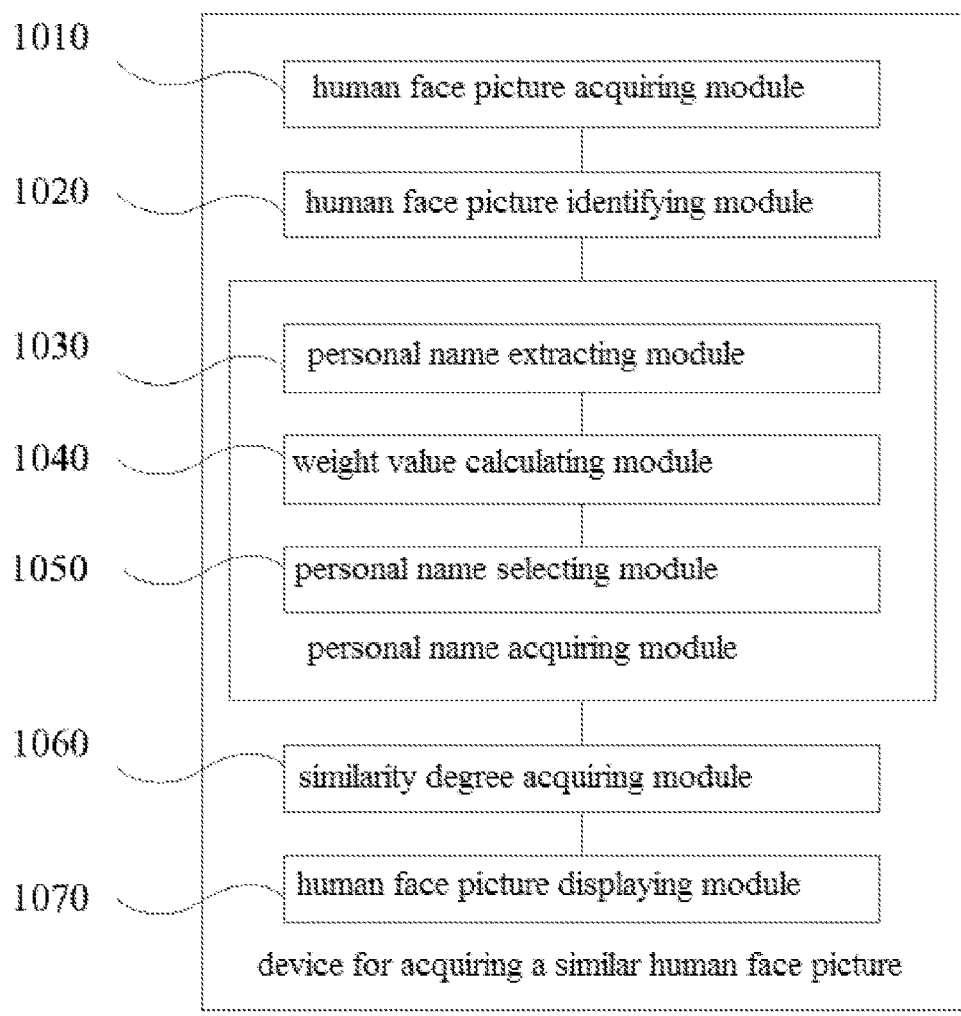
FIG. 10 illustrates a block diagram of a device for acquiring a similar human face picture according to an embodiment of the present invention.

As shown in FIG. 10, an embodiment of the present invention provides a device for acquiring a similar human face picture comprising the following parts.

A human face picture acquiring module 1010, acquiring a human face picture specified by a user.

A human face picture identifying module 1020, conducting human face identification to the human face picture to identify a similar human face picture of the human face picture from human face pictures that have already been collected.

A personal name acquiring module, specially comprising:

a personal name extracting module 1030, extracting one or more personal names from a text corresponding to the similar human face picture. In the present embodiment, there is no limitation on the type of the text, and it may be headline of news containing the picture, a text circling the picture, etc.;

a weight value calculating module 1040, according to attributes of the one or more personal names, calculating weight values for the one or more personal names. In the present embodiment, there is no limitation on the attributes, and they may be frequency or position of the personal names, since different frequencies and positions of personal names indicate different possibilities of the personal names corresponding to the similar human face picture; and a personal name selecting module 1050, according to levels of the weight values, selecting the personal name of the human face in the similar human face picture from the one or more personal names.

A similarity degree acquiring module 1060, acquiring a similarity degree between the similar human face picture and the human face picture, and accumulating similarity degrees corresponding to all the similar human face pictures having the same personal name; and A human face picture displaying module 1070, when a maximum similarity degree obtained by the accumulating is less than a predetermined threshold, according to the magnitudes of the similarity degrees corresponding to the similar human face pictures, selecting one or more human face pictures from the similar human face pictures and displaying to the user.

According to FIG. 10, for a news page where the similar human face picture comes from, first, preprocessing the headline of the news corresponding to the picture and the text circling the picture, then separating the words; extracting candidate personal names from the word separating result, comparing them with a personal name word list, and removing the words that are not a personal name; calculating a weight according to frequency and position of each personal name and its relation with other words; if the weight is larger than a certain threshold, selecting the name having the maximum weight as the personal name of the human face in the picture, otherwise it will be deemed that a reliable personal name cannot be extracted.

Presently, when conventional Internet pictures are displayed, besides the pictures themselves, only simple texts or heading information are displayed. It is difficult for the user to obtain other information relevant to the pictures besides seeing the simple texts or heading information, so the information obtained by the user is very deficient. Even searching by a search engine which is based on the picture content, it is difficult to obtain more accurate information of the picture because of limitation of existing picture searching techniques. In addition, regarding a picture containing a person, the user often hopes to know more information of the person, but does not know how to organize the search terms and conduct a search; thus search engines are inefficient in solving such problems and the user's experience is not good. In view of these problems, the present invention provides the following technical solutions.

Figure 11:
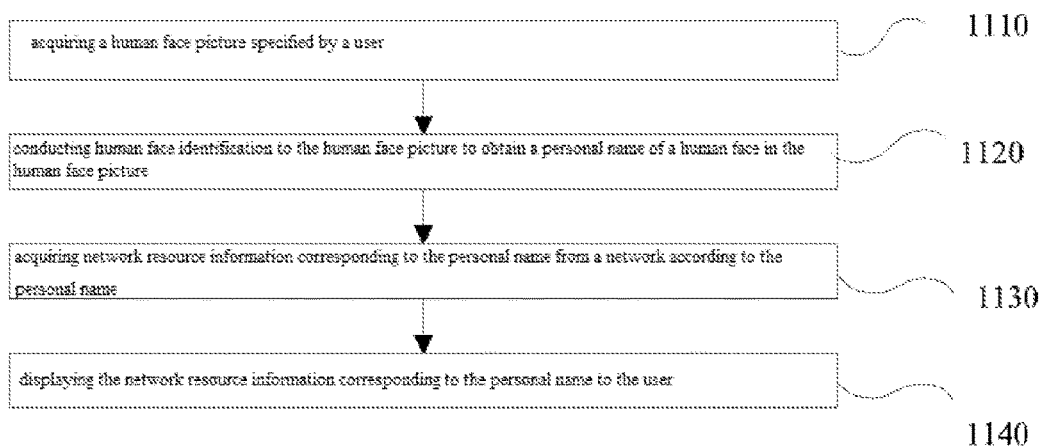
FIG. 11 illustrates a flow chart of a method for acquiring information about a human face picture according to an embodiment of the present invention.

As shown in FIG. 11, an embodiment of the present invention provides a method for acquiring information about a human face picture comprising the following steps.

Step 1110, acquiring a human face picture specified by a user.

Step 1120, conducting human face identification to the human face picture to obtain a personal name of a human face in the human face picture. In the present embodiment, acquiring a personal name can be completed based on conventional human face identification techniques.

Step 1130, acquiring network resource information corresponding to the personal name from a network according to the personal name.

Step 1140, displaying the network resource information corresponding to the personal name to the user. According to the technical solution of the present embodiment, by way of human face identification, the personal name involved in the human face picture can be accurately identified out, and the picture can be related to relevant information of the personal name, thereby more information is provided to the user.

According to FIG. 11, regarding a photograph of a star A inputted by the user, it can be automatically identified out that his/her personal name is A. If a search is conducted by using a search engine with A as the keyword, relevant reports regarding the star A can be obtained and provided to the user, which facilitates the user to learn about the star A.

Figure 12:
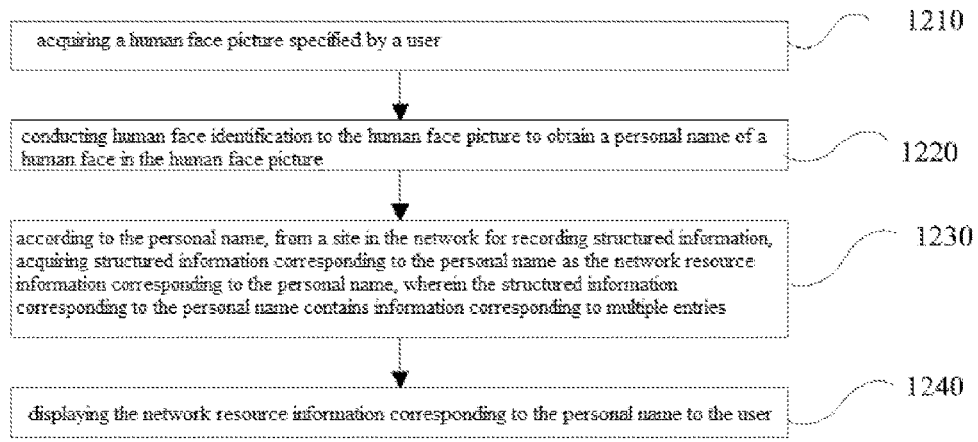
FIG. 12 illustrates a flow chart of a method for acquiring information about a human face picture according to an embodiment of the present invention.

As shown in FIG. 12, an embodiment of the present invention provides a method for acquiring information about a human face picture comprising the following steps.

Step 1210, acquiring a human face picture specified by a user.

Step 1220, conducting human face identification to the human face picture to obtain a personal name of a human face in the human face picture.

Step 1230, according to the personal name, from a site in the network for recording structured information, acquiring structured information corresponding to the personal name as the network resource information corresponding to the personal name, wherein the structured information corresponding to the personal name contains information corresponding to multiple entries. In the present embodiment, sites for recording structured information are typically encyclopedia websites. As the information in encyclopedia websites is all structured, they can be directly fetched when the corresponding personal name is found.

Step 1240, displaying the network resource information corresponding to the personal name to the user. According to the technical solution of the present embodiment, as the distribution of multiple entries in the structured information is relatively clear and definite, it facilitates the user to learn about the person involved in the human face picture.

According to FIG. 12, for a picture of the star A selected on a webpage by the user, the human face is automatically detected and identified, and it is identified out that the personal name is A. Then, according to the personal name, the relevant structured information of the person is acquired from an encyclopedia website, including his personal profile, experience, height, weight, major works and newest Weibo updating. Thus, it can facilitate the user knowing the star A, obtaining more information and news of the star A, and establishing contact and interaction with the star A via Weibo.

Figure 13:
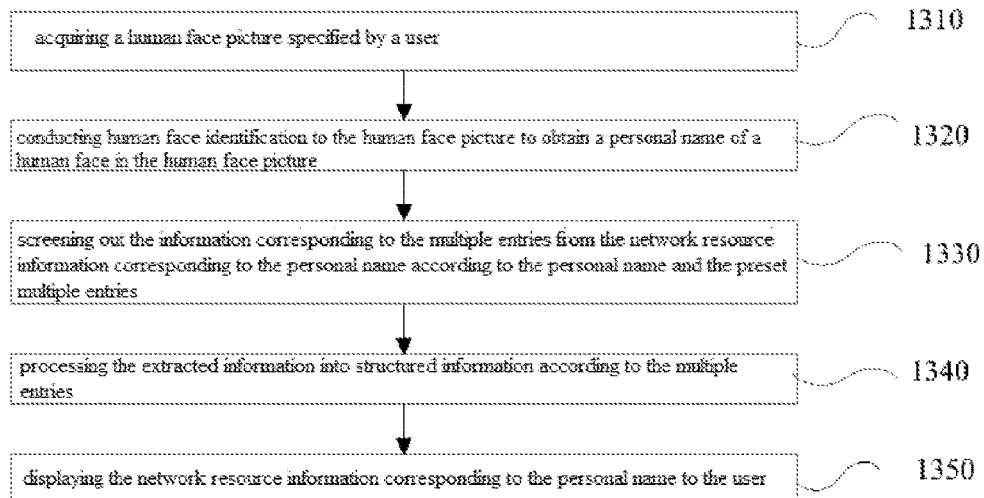
FIG. 13 illustrates a flow chart of a method for acquiring information about a human face picture according to an embodiment of the present invention.

As shown in FIG. 13, an embodiment of the present invention provides a method for acquiring information about a human face picture comprising the following steps.

Step 1310, acquiring a human face picture specified by a user.

Step 1320, conducting human face identification to the human face picture to obtain a personal name of a human face in the human face picture. In the present embodiment, acquiring a personal name can be completed based on conventional human face identification techniques.

Step 1330, screening out the information corresponding to the multiple entries from the network resource information corresponding to the personal name, according to the personal name and the preset multiple entries. In the present embodiment, there is no limitation on the type of entry, it may be, for example, height, weight, etc. Further, in order to notice in time the news of the person, the entry may be a social network account number entry; in order to know in time relevant events of the person, the entry may be an information message entry.

Step 1340, processing the extracted information into structured information according to the multiple entries. In the present embodiment, referring to the above contents, it can, according to the social network account number entry, look up identification information of a social network account number corresponding to the personal name and/or content issued by a social network account number corresponding to the personal name; and can also, according to the news information entry, acquire news information corresponding to the personal name from a network.

Step 1350, displaying the network resource information corresponding to the personal name to the user. According to the technical solution of the present embodiment, information in the network can be changed into structured information and provide to the user. Further, social media updating and latest news of the relevant person can be acquired according to the human face picture.

According to FIG. 13, for a picture of the star A selected on a webpage by the user, the human face is automatically detected and identified, and it is identified out that the personal name is A. Then, according to the personal name, finding the Weibo account number of the relevant person, and providing the Weibo account number "starA" and the latest updating issued by the account number "I am very busy" to the user. Alternatively, according to the personal name, finding the latest news on a controversial event of the relevant person, and providing the news headline to the user.

Figure 14:
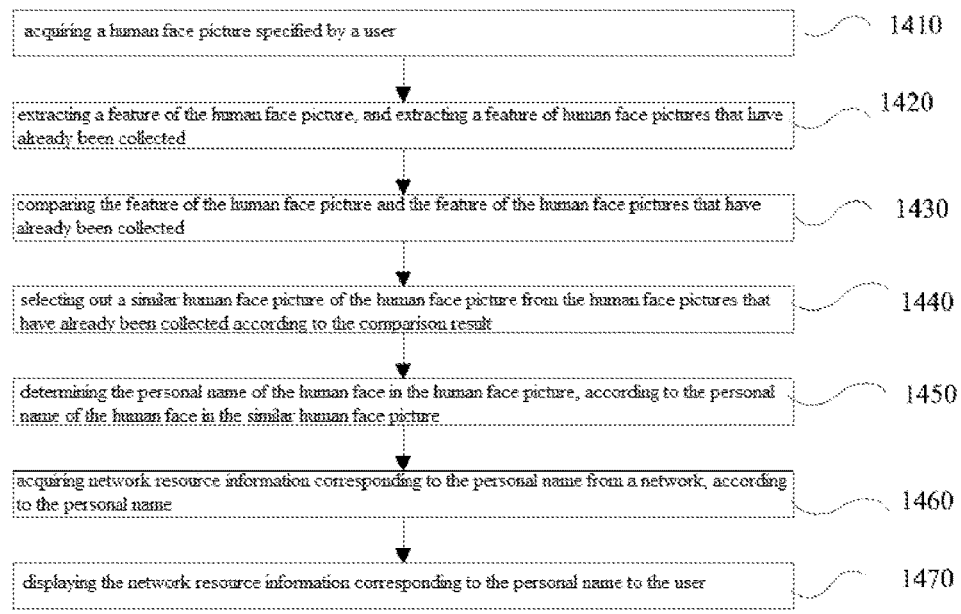
FIG. 14 illustrates a flow chart of a method for acquiring information about a human face picture according to an embodiment of the present invention.

As shown in FIG. 14, an embodiment of the present invention provides a method for acquiring information about a human face picture comprising the following steps.

Step 1410, acquiring a human face picture specified by a user;

Step 1420, extracting a feature of the human face picture, and extracting a feature of human face pictures that have already been collected. In the present embodiment, the human face picture specified by the user can be preprocessed and normalized in advance, to facilitate the feature extracting. In the present embodiment, it is possible to collect sample human face pictures, and detect skin color, eyes, nose, mouth corners, etc. The data obtained by detection can be used to train a human face model, and by using the human face model, the position of the human face in the picture specified by the user can be identified out, and the feature can be extracted.

Step 1430, comparing the feature of the human face picture and the feature of the human face pictures that have already been collected.

Step 1440, selecting out a similar human face picture of the human face picture from the human face pictures that have already been collected according to the comparison result.

Step 1450, determining the personal name of the human face in the human face picture, according to the personal name of the human face in the similar human face picture.

Step 1460, acquiring network resource information corresponding to the personal name from a network according to the personal name.

Step 1470, displaying the network resource information corresponding to the personal name to the user. According to the technical solution of the present embodiment, by way of feature comparing, it facilitates accurately identifying the personal name corresponding to the human face picture.

Figure 15:
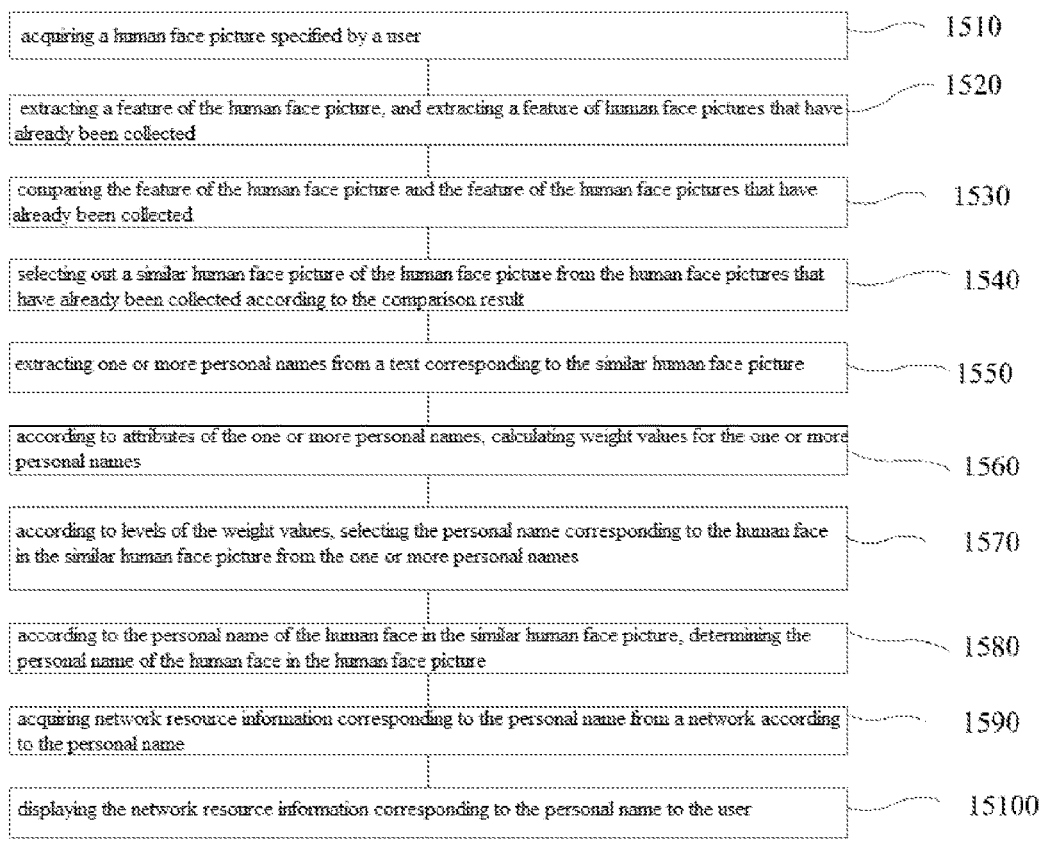
FIG. 15 illustrates a flow chart of a method for acquiring information about a human face picture according to an embodiment of the present invention.

As shown in FIG. 15, an embodiment of the present invention provides a method for acquiring information about a human face picture comprising the following steps.

Step 1510, acquiring a human face picture specified by a user.

Step 1520, extracting a feature of the human face picture, and extracting a feature of human face pictures that have already been collected.

Step 1530, comparing the feature of the human face picture and the feature of the human face pictures that have already been collected.

Step 1540, selecting out a similar human face picture of the human face picture from the human face pictures that have already been collected according to the comparison result.

Step 1550, extracting one or more personal names from a text corresponding to the similar human face picture. In the present embodiment, there is no limitation on the type of text, and it may be headline of news containing the picture, a text circling the picture, etc.

Step 1560, according to attributes of the one or more personal names, calculating weight values for the one or more personal names. In the present embodiment, there is no limitation on the attributes, and they may be frequency or position of the personal names, since different frequencies and positions of personal names indicate different possibilities of the personal names corresponding to the similar human face picture.

Step 1570, according to levels of the weight values, selecting the personal name corresponding to the human face in the similar human face picture from the one or more personal names.

Step 1580, according to the personal name of the human face in the similar human face picture, determining the personal name of the human face in the human face picture.

Step 1590, acquiring network resource information corresponding to the personal name from a network, according to the personal name.

Step 15100, displaying the network resource information corresponding to the personal name to the user.

According to FIG. 15, for a news page where the similar human face picture comes from, first, preprocessing the headline of the news corresponding to the picture and the text circling the picture, then separating the words; extracting candidate personal names from the word separating result, comparing them with a personal name word list, and removing the words that are not a personal name; calculating a weight according to frequency and position of each personal name and its relation with other words; if the weight is larger than a certain threshold, selecting the name having the maximum weight as the personal name of the human face in the picture, otherwise it will be deemed that a reliable personal name cannot be extracted.

Figure 16:
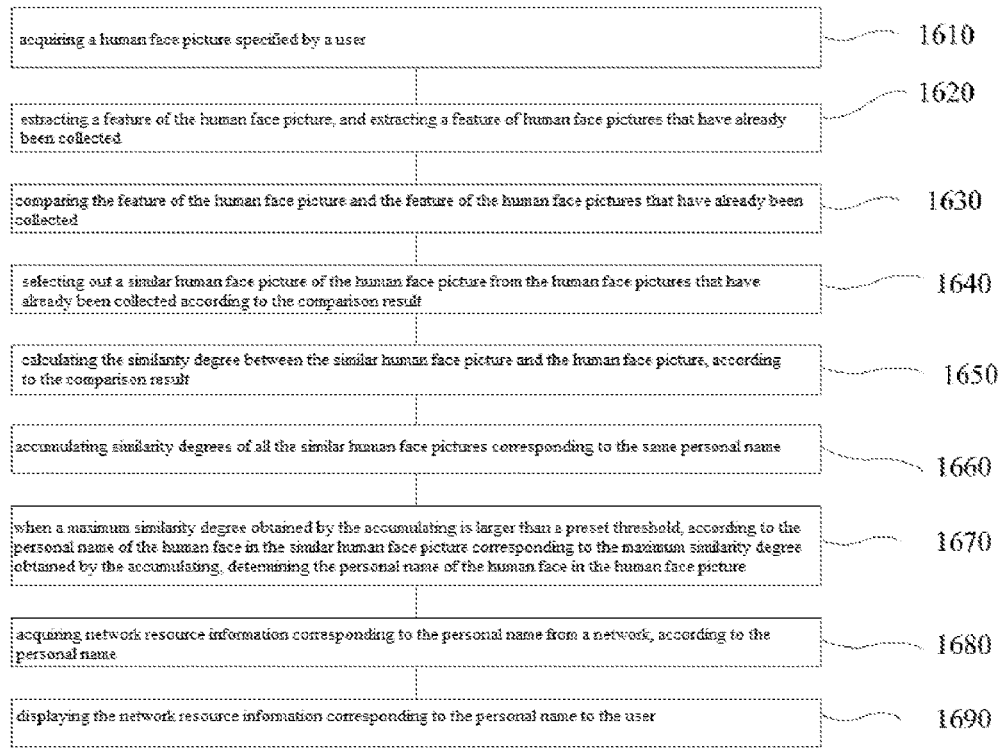
FIG. 16 illustrates a flow chart of a method for acquiring information about a human face picture according to an embodiment of the present invention.

As shown in FIG. 16, an embodiment of the present invention provides a method for acquiring information about a human face picture comprising the following steps.

Step 1610, acquiring a human face picture specified by a user.

Step 1620, extracting a feature of the human face picture, and extracting a feature of human face pictures that have already been collected.

Step 1630, comparing the feature of the human face picture and the feature of the human face pictures that have already been collected.

Step 1640, selecting out a similar human face picture of the human face picture from the human face pictures that have already been collected according to the comparison result.

Step 1650, calculating the similarity degree between the similar human face picture and the human face picture, according to the comparison result.

Step 1660, accumulating similarity degrees of all the similar human face pictures corresponding to the same personal name.

Step 1670, when a maximum similarity degree obtained by the accumulating is larger than a preset threshold, according to the personal name of the human face in the similar human face picture corresponding to the maximum similarity degree obtained by the accumulating, determining the personal name of the human face in the human face picture. In the present embodiment, based on the similarity degree obtained by the accumulating, accurate identifying of the human face can be realized.

Step 1680, acquiring network resource information corresponding to the personal name from a network, according to the personal name.

Step 1690, displaying the network resource information corresponding to the personal name to the user.

According to FIG. 16, judging whether the picture specified by the user belongs to a certain human face in a database where personal names have been established (human face pictures that have already been collected). First, establishing a database of the human faces of known personal names by human face detection, feature extracting and personal name extracting; for a new human face picture specified by the user, conducting face detection to the picture; if there is not the human face, returning directly; if there is the human face, extracting a feature of the human face, and quantifying it into a high dimension vector. Then comparing the vector of the inputted picture and high dimension vectors of all the human face features in the database, calculating their Euclidean distance, and taking the first N vectors with the lowest distances. The human faces characterized by these vectors are the human faces most similar to the inputted human face. If the human face database is too large, it will take very long to compare one by one. Thus, alternatively, classifying the human faces in the database in advance, then comparing with the human faces that have already been classified only. For the first N similar human faces, calculating the weight of each name with the similarity degree as the weight, adding the weight values of the same name, and finding the name having the highest weight. If the name is larger than a certain threshold, the inputted human face is deemed to belong to the human faces corresponding to the name; otherwise it will be deemed that the human face cannot be accurately identified out.

Figure 17:
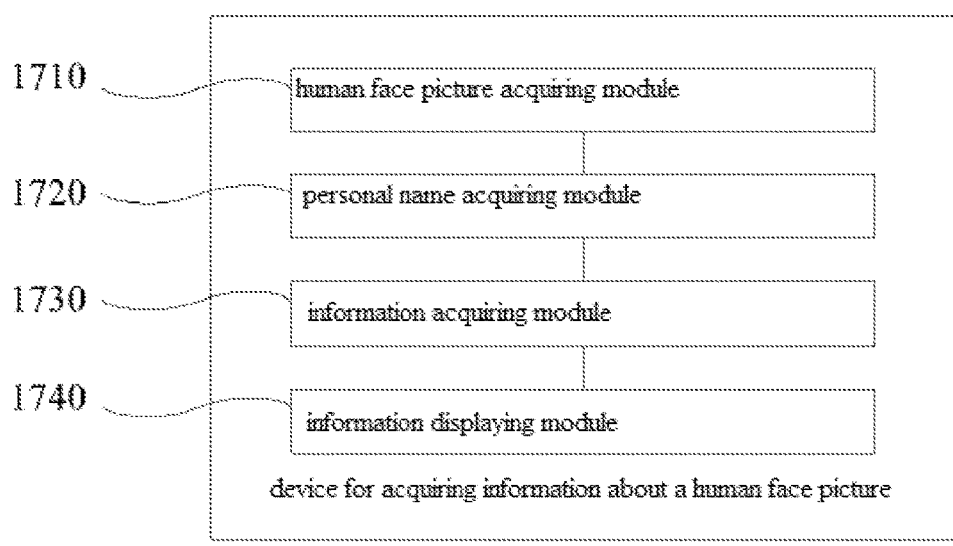
FIG. 17 illustrates a block diagram of a device for acquiring information about a human face picture according to an embodiment of the present invention.

As shown in FIG. 17, an embodiment of the present invention provides a device for acquiring information about a human face picture comprising the following parts.

A human face picture acquiring module 1710, acquiring a human face picture specified by a user.

A personal name acquiring module 1720, conducting human face identification to the human face picture obtaining a personal name of a human face in the human face picture. In the present embodiment, the acquiring of the personal name can be completed based on conventional human face identification techniques.

An information acquiring module 1730, acquiring network resource information corresponding to the personal name from a network, according to the personal name.

An information displaying module 1740, displaying the network resource information corresponding to the personal name to the user. According to the technical solution of the present embodiment, by way of human face identification, the personal name involved in the human face picture can be accurately identified out, and the picture can be related to relevant information of the personal name, thereby more information is provided to the user.

According to FIG. 17, regarding a photograph of a star A inputted by the user, it can be automatically identified out that his/her personal name is A. If a search is conducted by using a search engine with A as the keyword, relevant reports regarding the star A can be obtained and provided to the user, which facilitates the user to learn about the star A.

An embodiment of the present invention provides a device for acquiring information about a human face picture comprising the following parts.

A human face picture acquiring module 1710, acquiring a human face picture specified by a user.

A personal name acquiring module 1720, conducting human face identification to the human face picture to obtain a personal name of a human face in the human face picture.

An information acquiring module 1730, according to the personal name, from a site in the network for recording structured information, acquiring structured information corresponding to the personal name as the network resource information corresponding to the personal name, wherein the structured information corresponding to the personal name contains information corresponding to multiple entries. In the present embodiment, sites for recording structured information are typically encyclopedia websites. As the information in encyclopedia websites is all structured, they can be directly fetched when the corresponding personal name is found.

An information displaying module 1740, displaying the network resource information corresponding to the personal name to the user. According to the technical solution of the present embodiment, as the distribution of multiple entries in the structured information is relatively clear and definite, it facilitates the user to learn about the person involved in the human face picture.

According to FIG. 17, for a picture of the star A selected on a webpage by the user, the human face is automatically detected and identified, and it is identified out that the personal name is A. Then, according to the personal name, the relevant structured information of the person is acquired from an encyclopedia website, including his personal profile, experience, height, weight, major works and newest Weibo updating. Thus, it can facilitate the user knowing the star A, obtaining more information and news of the star A, and establishing contact and interaction with the star A via Weibo.

An embodiment of the present invention provides a device for acquiring information about a human face picture comprising the following parts.

A human face picture acquiring module 1710, acquiring a human face picture specified by a user.

A personal name acquiring module 1720, conducting human face identification to the human face picture to obtain a personal name of a human face in the human face picture. In the present embodiment, acquiring a personal name can be completed based on conventional human face identification techniques.

An information acquiring module 1730, screening out information corresponding to the multiple entries from the network resource information corresponding to the personal name, according to the personal name and the preset multiple entries. In the present embodiment, there is no limitation on the type of entry, and it may be, for example, height, weight, etc. Further, in order to notice in time the news of the person, the entry may be a social network account number entry; in order to know in time relevant events of the person, the entry may be an information message entry. Further, according to the multiple entries, processing the extracted information into structured information. In the present embodiment, referring to the above contents, it can, according to the social network account number entry, look up identification information of a social network account number corresponding to the personal name and/or content issued by a social network account number corresponding to the personal name; and can also, according to the news information entry, acquire news information corresponding to the personal name from a network.

An information displaying module 1740, displaying the network resource information corresponding to the personal name to the user. According to the technical solution of the present embodiment, information in the network can be changed into structured information and provide to the user. Further, social media updating and latest news of the relevant person can be acquired according to the human face picture.

According to FIG. 17, for a picture of the star A selected on a webpage by the user, the human face is automatically detected and identified, and it is identified out that the personal name is A. Then, according to the personal name, finding the Weibo account number of the relevant person, and providing the Weibo account number "starA" and the latest updating issued by the account number "I am very busy" to the user. Alternatively, according to the personal name, finding the latest news on a controversial event of the relevant person, and providing the news headline to the user.

Figure 18:
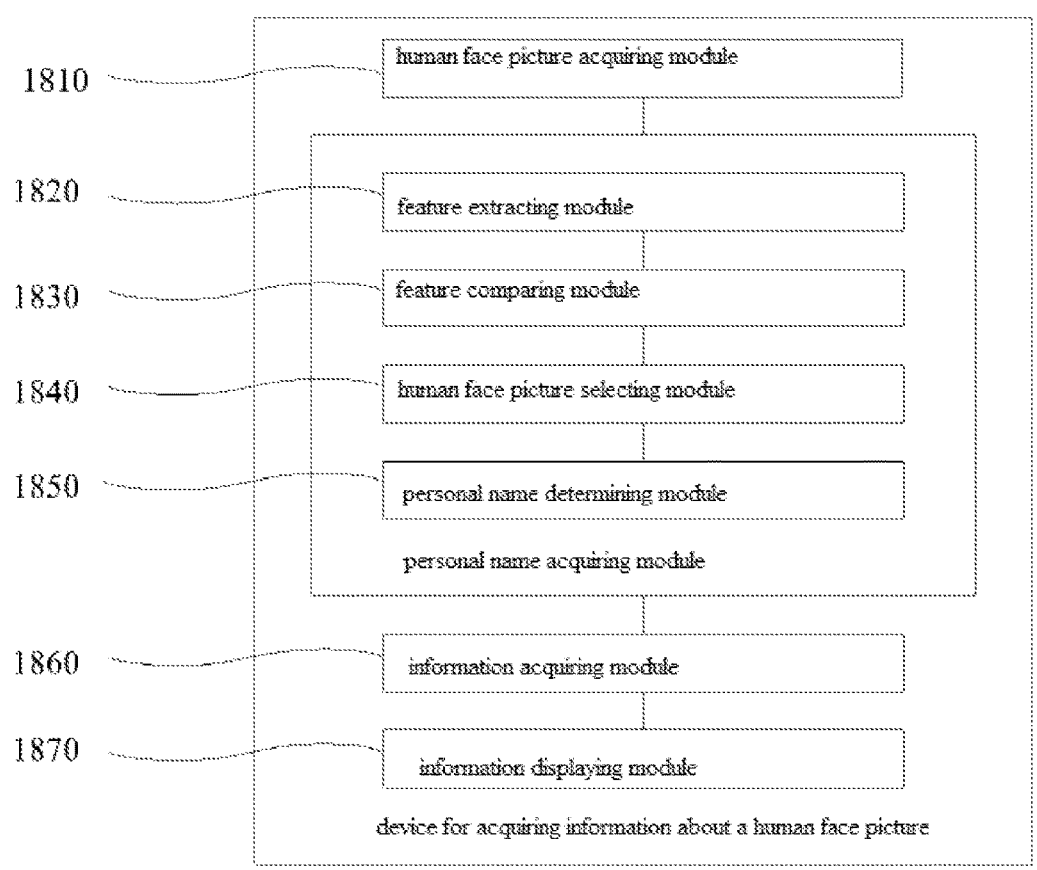
FIG. 18 illustrates a block diagram of a device for acquiring information about a human face picture according to an embodiment of the present invention.

As shown in FIG. 18, an embodiment of the present invention provides a device for acquiring information about a human face picture comprising the following parts.

A human face picture acquiring module 1810, acquiring a human face picture specified by a user.

A personal name acquiring module, specially comprising:

a feature extracting module 1820, extracting a feature of the human face picture, and extracting a feature of human face pictures that have already been collected. In the present embodiment, the human face picture specified by the user can be preprocessed and normalized in advance, to facilitate the feature extracting. In the present embodiment, it is possible to collect sample human face pictures, and detect skin color, eyes, nose, mouth corners, etc. The data obtained by detection can be used to train a human face model, and by using the human face model, the position of the human face in the picture specified by the user can be identified out, and the feature can be extracted;

a feature comparing module 1830, comparing the feature of the human face picture and the feature of the human face pictures that have already been collected;

a human face picture selecting module 1840, selecting out a similar human face picture of the human face picture from the human face pictures that have already been collected according to the comparison result; and a personal name determining module 1850, determining the personal name of the human face in the human face picture, according to the personal name of the human face in the similar human face picture.

An information acquiring module 1860, acquiring network resource information corresponding to the personal name from a network, according to the personal name.

An information displaying module 1870, displaying the network resource information corresponding to the personal name to the user. According to the technical solution of the present embodiment, by way of feature comparing, it facilitates accurately identifying the personal name corresponding to the human face picture.

Figure 19:
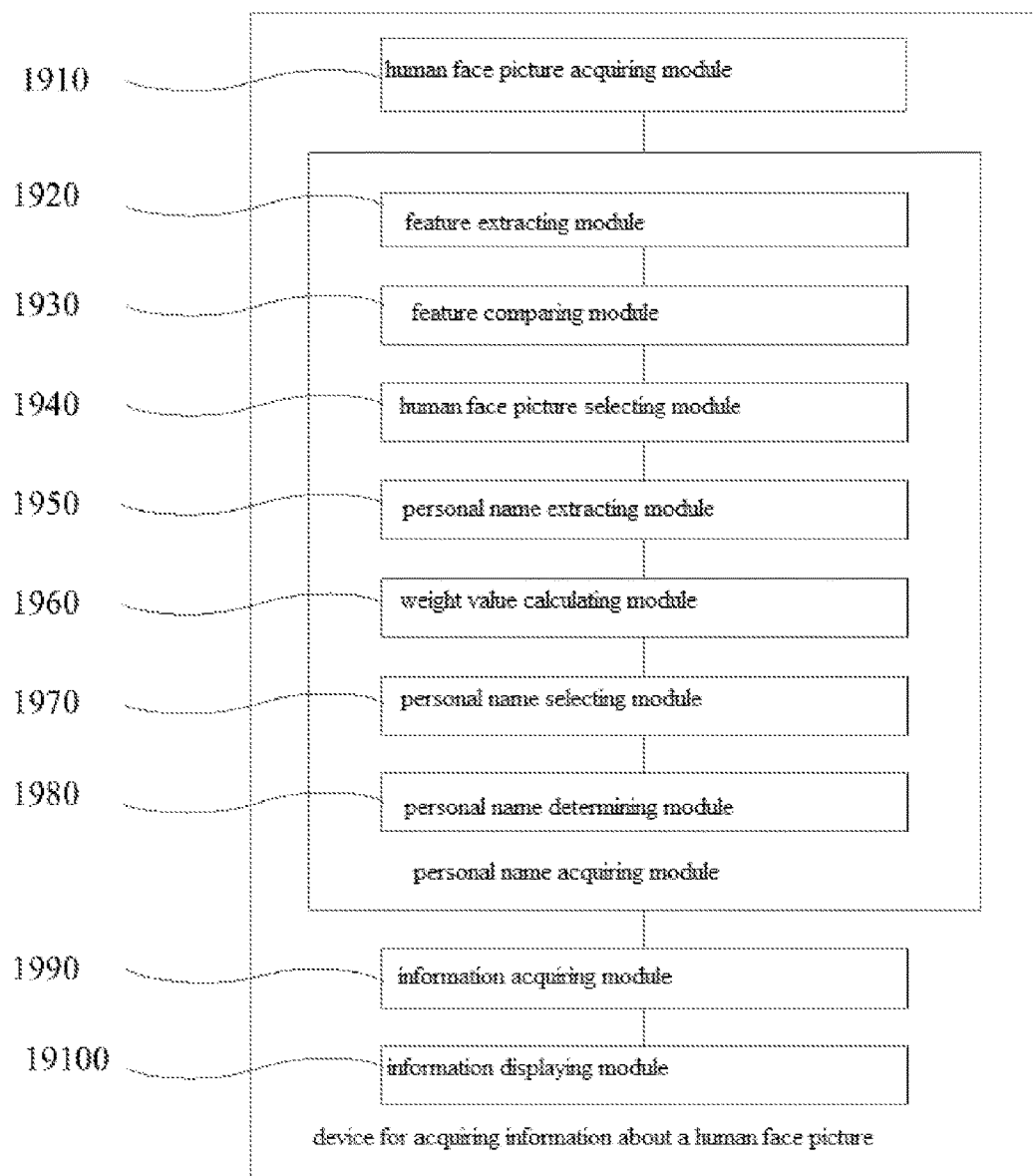
FIG. 19 illustrates a block diagram of a device for acquiring information about a human face picture according to an embodiment of the present invention.

As shown in FIG. 19, an embodiment of the present invention provides a device for acquiring information about a human face picture comprising the following parts.

A human face picture acquiring module 1910, acquiring a human face picture specified by a user;

A personal name acquiring module, specially comprising:

a feature extracting module 1920, extracting a feature of the human face picture, and extracting a feature of human face pictures that have already been collected;

a feature comparing module 1930, comparing the feature of the human face picture and the feature of the human face pictures that have already been collected;

a human face picture selecting module 1940, selecting out a similar human face picture of the human face picture from the human face pictures that have already been collected according to the comparison result;

a personal name extracting module 1950, extracting one or more personal names from a text corresponding to the similar human face picture. In the present embodiment, there is no limitation on the type of text, and it may be headline of news containing the picture, a text circling the picture, etc.;

a weight value calculating module 1960, according to attributes of the one or more personal names, calculating weight values for the one or more personal names. In the present embodiment, there is no limitation on the attributes, and they may be frequency or position of the personal names, since different frequencies and positions of personal names indicate different possibilities of the personal names corresponding to the similar human face picture;

a personal name selecting module 1970, according to levels of the weight values, selecting the personal name corresponding to the human face in the similar human face picture from the one or more personal names; and a personal name determining module 1980, determining the personal name of the human face in the human face picture, according to the personal name of the human face in the similar human face picture.

An information acquiring module 1990, acquiring network resource information corresponding to the personal name from a network, according to the personal name; and An information displaying module 19100, displaying the network resource information corresponding to the personal name to the user.

According to FIG. 19, for a news page where the similar human face picture comes from, first, preprocessing the headline of the news corresponding to the picture and the text circling the picture, then separating the words; extracting candidate personal names from the word separating result, comparing them with a personal name word list, and removing the words that are not a personal name; calculating a weight according to frequency and position of each personal name and its relation with other words; if the weight is larger than a certain threshold, selecting the name having the maximum weight as the personal name of the human face in the picture, otherwise it will be deemed that a reliable personal name cannot be extracted.

Figure 20:
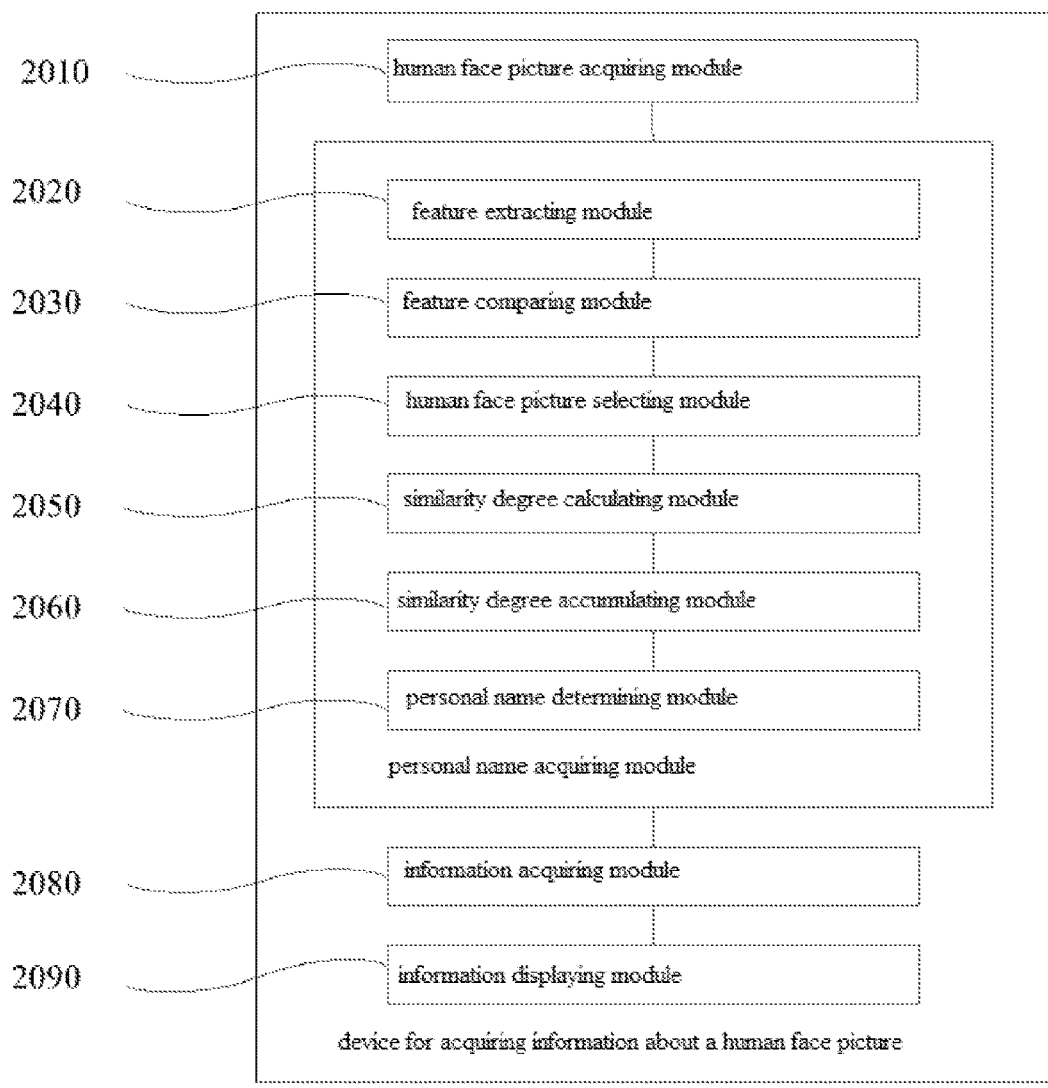
FIG. 20 illustrates a block diagram of a device for acquiring information about a human face picture according to an embodiment of the present invention.

As shown in FIG. 20, an embodiment of the present invention provides a device for acquiring information about a human face picture comprising the following parts.

A human face picture acquiring module 2010, acquiring a human face picture specified by a user;

A personal name acquiring module, specially comprising:

a feature extracting module 2020, extracting a feature of the human face picture, and extracting a feature of human face pictures that have already been collected;

a feature comparing module 2030, comparing the feature of the human face picture and the feature of the human face pictures that have already been collected;

a human face picture selecting module 2040, selecting out a similar human face picture of the human face picture from the human face pictures that have already been collected according to the comparison result;

a similarity degree calculating module 2050, calculating the similarity degree between the similar human face picture and the human face picture, according to the comparison result;

a similarity degree accumulating module 2060, accumulating similarity degrees of all the similar human face pictures corresponding to the same personal name; and a personal name determining module 2070, when a maximum similarity degree obtained by the accumulating is larger than a preset threshold, according to the personal name of the human face in the similar human face picture corresponding to the maximum similarity degree obtained by the accumulating, determining the personal name of the human face in the human face picture. In the present embodiment, based on the similarity degree obtained by the accumulating, accurate identifying of the human face can be realized.

An information acquiring module 2080, acquiring network resource information corresponding to the personal name from a network, according to the personal name.

An information displaying module 2090, displaying the network resource information corresponding to the personal name to the user.

According to FIG. 20, judging whether the picture specified by the user belongs to a certain human face in a database where personal names have been established (human face pictures that have already been collected). First, establishing a database of the human faces of known personal names by human face detection, feature extracting and personal name extracting; for a new human face picture specified by the user, conducting face detection to the picture; if there is not the human face, returning directly; if there is the human face, extracting a feature of the human face, and quantifying it into a high dimension vector. Then comparing the vector of the inputted picture and high dimension vectors of all the human face features in the database, calculating their Euclidean distance, and taking the first N vectors with the lowest distances. The human faces characterized by these vectors are the human faces most similar to the inputted human face. If the human face database is too large, it will take very long to compare one by one. Thus, alternatively, classifying the human faces in the database in advance, then comparing with the human faces that have already been classified only. For the first N similar human faces, calculating the weight of each name with the similarity degree as the weight, adding the weight values of the same name, and finding the name having the highest weight. If the name is larger than a certain threshold, the inputted human face is deemed to belong to the human faces corresponding to the name; otherwise it will be deemed that the human face cannot be accurately identified out.

Algorithm and display provided herein are not inherently related to any particular computer, virtual system or other equipment. Various general systems may also be used with the teaching based on the disclosure. According to the above description, the required structure for constructing such a system is obvious. In addition, the present invention is not directed to any particular programming language. It should be understood that a variety of programming languages can be used to implement the disclosed contents of the present invention as described herein, and the above description of the particular programming language is to disclose the best mode for carrying out the present invention.

Many details are discussed in the specification provided herein. However, it should be understood that the embodiments of the present invention can be implemented without these specific details. In some examples, the well-known methods, structures and technologies are not shown in detail so as not to obscure the understanding of the description.

Similarly, it should be understood that, in order to simplify the disclosure and to facilitate the understanding of one or more of various aspects thereof, in the above description of the exemplary embodiments of the present invention, various features of the present invention may sometimes be grouped together into a single embodiment, accompanying figure or description thereof. However, this method of disclosing should not be construed as follows: the present invention for which the protection is sought specifies more features than those explicitly disclosed in each of claims. More specifically, as reflected in the following claims, the features of an inventive aspect are fewer than all features of a single embodiment as disclosed above. Therefore, claims corresponding to specific embodiments are definitely incorporated into the specific embodiments, and each claim itself can be considered as a separate embodiment of the present invention.

It should be understood by those skilled in the art that modules of the device in an embodiment can be self-adaptively modified and arranged in one or more devices different from the embodiment. Modules, units or components in the embodiment can be combined into one module, unit or component, and can also be divided into more sub-modules, sub-units or sub-components. Except that at least some of features and/or processes or units are mutually exclusive, various combinations can be adopted to combine all the features disclosed in specification (including claims, abstract and accompanying figures) and all the processes or units of any methods or devices as disclosed herein. Unless otherwise definitely stated, each of features disclosed in specification (including claims, abstract and accompanying figures) may be replaced by an alternative feature having same, equivalent or similar purpose.

In addition, it should be understood by those skilled in the art, although some embodiments as discussed herein comprise some but not all of features included in other embodiments, combination of features in different embodiment means that the combination is within the scope of the present invention and forms a different embodiment. For example, in the following claims, any one of the embodiments for which the protection is sought can be used in any combination manner.

Embodiments regarding the parts or components in the present invention may be implemented in hardware, or implemented by software modules running on one or more processors, or implemented by the combination thereof. A person skilled in the art should understand that, in practice, a microprocessor or a digital signal processor (DSP) may be used to realize some or all of the functions of some or all of the parts or components of the device for acquiring a similar human face picture according to the embodiments of the present invention. The present invention may further be implemented as device programs (for example, computer programs and computer program products) for executing some or all of the methods as described herein. Such programs for implementing the present invention may be stored on a computer readable medium, or have the form of one or more signals. Such signals may be downloaded from the internet websites, or be provided on a carrier signal, or be provided in other manners.

Figure 21:
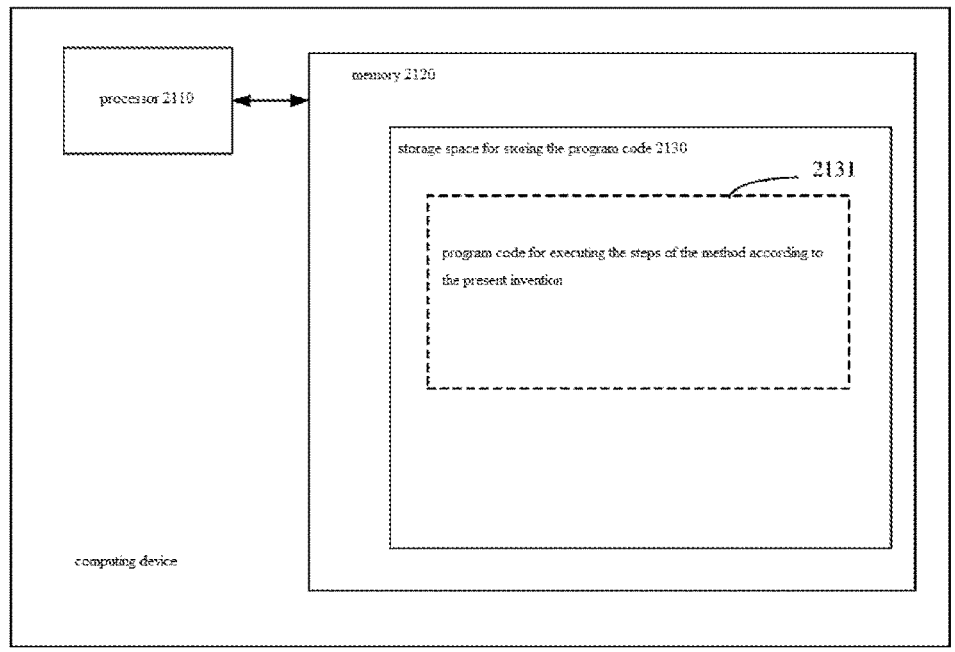
FIG. 21 schematically illustrates a block diagram of a computing device for executing a method according to the present invention.
Figure 22:
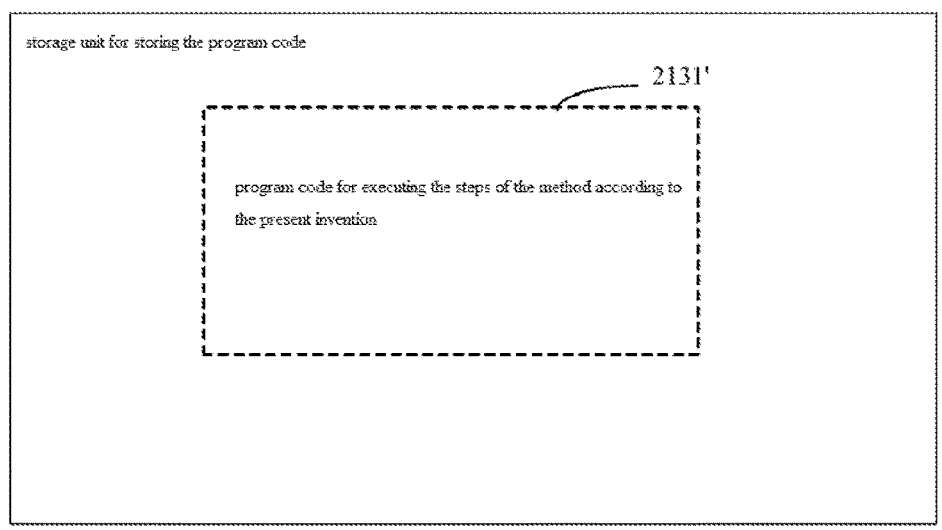
FIG. 22 schematically illustrates a storage unit for containing or carrying a program code for implementing a method according to the present invention.

For example, FIG. 21 schematically illustrates a block diagram of a computing device for executing the method according to the present invention. The computing device conventionally comprises a processor 2110 and a computer program product or computer-readable medium in the form of a memory 2120. The memory 2120 may be an electronic memory such as a flash memory, EEPROM (Electrically Erasable Programmable Read-Only Memory), EPROM, hard disk or ROM. The memory 2120 has a storage space 2130 for a program code 2131 for executing any step of the above method. For example, the storage space 2130 for the program code may comprise program codes 2131 for respectively implementing steps of the above method. These program codes may be read from one or more computer program products or written into the one or more computer program products. These computer program products comprise program code carriers such as hard disk, compact disk (CD), memory card, floppy disk or the like. Such computer program products are usually portable or fixed memory units as shown in FIG. 22. The memory unit may have a storage section, a storage space or the like arranged in a similar way to the memory 2120 in the computing device of FIG. 21. The program code may for example be compressed in a suitable form. Usually, the memory unit includes a computer-readable code 2131', namely, a code could be read by a processor such as 2110. When these codes are run by the computing device, the computing device is caused to execute each of the steps of the method described above.

It should be noted that the above-described embodiments are intended to illustrate but not to limit the present invention, and alternative embodiments may be devised by the person skilled in the art without departing from the scope of claims as appended. In the claims, any reference symbols between brackets should not be construed as a limitation of the claims. The wording "comprise" does not exclude the presence of elements or steps not listed in a claim. The wording "a" or "an" preceding an element does not exclude the presence of a plurality of such elements. The present invention may be realized by means of hardware comprising a number of different elements and by means of a suitably programmed computer. In the device claim listing a plurality of units, some of these units may be embodied in the same hardware. The wordings "first", "second", and "third", etc. do not denote any order. These wordings may be interpreted as names.

Furthermore, it should also be note that, the languages used in the description are chosen mainly for the purposes of readability and teaching, and are not for interpreting or limiting the subject matter of the present invention. Therefore, various modifications and alterations are apparent for a person skilled in the art without departing from the scope and spirit of the attached claims. Regarding the scope of the present invention, the disclosure of the present invention is illustrative, rather than restrictive, and the scope of the present invention is defined by the attached claims.

The present invention can be applied to computer systems/servers, which can be operated together with various other general-purpose or special-purpose computing system environments or configurations. The examples of well-known computing systems, environments and/or configurations that are suitable for use with the computer systems/servers include, but are not limited to: personal computer systems, server computer systems, thin clients, thick clients, hand-held or laptop devices, microprocessor-based systems, set top boxes, programmable consumer electronic products, network personal computers, small computer systems, large computer systems and distributed cloud computing technique environments that comprise any of the above systems, etc.

The computer systems/servers can be described in the general context of computer system executable instructions (such as program modules) executed by the computer systems. In general, the program modules may include routines, programs, object programs, components, logics, data structures, etc., which execute specific tasks or implement specific abstract data types. The computer systems/servers can be implemented in distributed cloud computing environments, and in distributed cloud computing environments, tasks are executed by remote processing devices linked by a communication network. In distributed cloud computing environments, program modules can be located on a local or remote computing system storage medium including storage devices.

The "one embodiment", "an embodiment" or "one or more embodiments" stated herein indicates that, the specific features, structures or characteristics that are described with reference to the embodiment are included in at least one embodiment of the present invention. Furthermore, it should be noted that, the wordings such as "in an embodiment" herein do not necessarily refer to the same one embodiment.

What is claimed is:

1. A computer-executable method for acquiring a similar human face picture, comprising:
    acquiring a human face picture specified by a user from a user interface;
    conducting human face identification to the human face picture to identify a similar human face picture of the human face picture from human face pictures that have already been collected; and
    displaying the similar human face picture on a screen to the user;
    wherein, before the displaying the similar human face picture on a screen to the user, the method further comprising:
    acquiring a personal name of a human face in the similar human face picture;
    conducting human face identification to the human face picture to identify a similar human face picture of the human face picture from human face pictures that have already been collected, comprising:
    acquiring a similarity degree between the similar human face picture and the human face picture, and accumulating similarity degrees corresponding to all the similar human face pictures having the same personal name, when a maximum similarity degree obtained by the accumulating is less than a predetermined threshold, according to the magnitudes of the similarity degrees corresponding to the similar human face pictures, selecting one or more human face pictures from the similar human face pictures, and displaying the similar human face picture on a screen to the user, comprising:
    displaying the one or more human face pictures on a screen to the user.

2. The method according to claim 1, wherein, the method further comprising:
    displaying the similarity degrees corresponding to the one or more human face pictures and/or the personal names of the human faces therein to the user.

3. The method according to claim 1, wherein, the method further comprising: setting a displaying sequence of the one or more human face pictures, according to levels of the similarity degrees corresponding to the one or more human face pictures.

4. The method according to claim 1, wherein, the method further comprising:
    according to levels of the similarity degrees corresponding to the one or more human face pictures, setting corresponding evaluation information for the one or more human face pictures and displaying to the user.

5. The method according to claim 1, wherein, the selecting one or more human face pictures from the similar human face pictures, comprising:
    acquiring the human face pictures in sequence according to the level of the similarity degrees corresponding to the similar human face pictures;
    judging whether the personal name of the human face in a most recently acquired human face picture is among other personal names of the human faces in the human face pictures that have already been acquired; and
    displaying the similar human face picture to the user, comprising:
    displaying the most recently acquired human face picture to the user when the judgement result is negative.

6. The method according to claim 1, wherein, the conducting human face identification to the human face picture to identify a similar human face picture of the human face picture from human face pictures that have already been collected comprising:
    extracting a feature of the human face picture, and extracting a feature of the human face pictures that have already been collected;
    comparing the feature of the human face picture and the feature of the human face pictures that have already been collected, obtained a comparison result;
    selecting out a similar human face picture from the human face pictures that have already been collected according to the comparison result; and
    acquiring a similarity degree between the similar human face picture and the human face picture, comprising:
    calculating the similarity degree between the similar human face picture and the human face picture according to the comparison result.

7. The method according to claim 1, wherein, the acquiring a personal name of a human face in the similar human face picture comprising:
    extracting one or more personal names from a text corresponding to the similar human face picture;

according to attributes of the one or more personal names, calculating weight values for the one or more personal names; and according to levels of the weight values, selecting the personal name of the human face in the similar human face picture from the one or more personal names.

8. A device, comprising:

a memory having instructions stored thereon, a processor configured to execute the instructions to perform operations for acquiring a similar human face picture, the operations comprising:

acquiring a human face picture specified by a user from a user interface;

conducting human face identification to the human face picture to identify a similar human face picture of the human face picture from human face pictures that have already been collected; and displaying the similar human face picture on a screen to the user;

the operations further comprises:

acquiring a personal name of a human face in the similar human face picture; and acquiring a similarity degree between the similar human face picture and the human face picture, and accumulating similarity degrees corresponding to all the similar human face pictures having the same personal name;

when a maximum similarity degree is less than a predetermined threshold, according to the magnitudes of the similarity degrees corresponding to the similar human face pictures, selecting one or more human face pictures from the similar human face pictures and displaying the one or more human face pictures to the user.

9. The device according to claim 8, wherein, the operations further comprising:

displaying the similarity degrees corresponding to the one or more human face pictures and/or the personal names of the human faces therein to the user.

10. The device according to claim 8, wherein, the operations further comprising:

according to levels of the similarity degrees corresponding to the one or more human face pictures, setting a displaying sequence of the one or more human face pictures.

11. The device according to claim 8, wherein, the operations further comprising:

according to levels of the similarity degrees corresponding to the one or more human face pictures, setting corresponding evaluation information for the one or more human face pictures and displaying to the user.

12. The device according to claim 8, wherein, the operations further comprising:

acquiring the human face pictures in sequence according to the level of the similarity degrees corresponding to the similar human face pictures; and judging whether the personal name of the human face in a most recently acquired human face picture is among other personal names of the human faces in the human face pictures that have already been acquired;

displaying the most recently acquired human face picture to the user, when the judgement result is negative.

13. The device according to claim 8, wherein, the operations further comprising:

extracting a feature of the human face picture, and extracting a feature of the human face pictures that have already been collected; and comparing the feature of the human face picture and the feature of the human face pictures that have already been collected, obtained a comparison result;

identifying a similar human face picture of the human face picture from human face pictures that have already been collected comprising the operation of: selecting out the similar human face picture from the human face pictures that have already been collected according to the comparison result; and acquiring a similarity degree between the similar human face picture and the human face picture comprising the operation of:

calculating the similarity degree between the similar human face picture and the human face picture according to the comparison result.

14. The device according to claim 8, wherein, acquiring a personal name of a human face in the similar human face picture comprising the operations of:

extracting one or more personal names from a text corresponding to the similar human face picture;

according to attributes of the one or more personal names, calculating weight values for the one or more personal names; and according to levels of the weight values, selecting the personal name of the human face in the similar human face picture from the one or more personal names.

15. A non-transitory computer readable medium that having instructions stored thereon, when executed by at least one processor, cause the at least one processor to perform operations for acquiring a similar human face picture, the operations comprising:

acquiring a human face picture specified by a user from a user interface;

conducting human face identification to the human face picture to identify a similar human face picture of the human face picture from human face pictures that have already been collected; and displaying the similar human face picture on a screen to the user the operations further comprises:

acquiring a personal name of a human face in the similar human face picture; and acquiring a similarity degree between the similar human face picture and the human face picture, and accumulating similarity degrees corresponding to all the similar human face pictures having the same personal name;

when a maximum similarity degree is less than a predetermined threshold, according to the magnitudes of the similarity degrees corresponding to the similar human face pictures, selecting one or more human face pictures from the similar human face pictures and displaying the one or more human face pictures to the user.

* * * * *